(12) United States Patent
Thomas et al.

(10) Patent No.: US 10,942,943 B2
(45) Date of Patent: Mar. 9, 2021

(54) DYNAMIC FIELD DATA TRANSLATION TO SUPPORT HIGH PERFORMANCE STREAM DATA PROCESSING

(71) Applicant: IP Reservoir, LLC, Creve Coeur, MO (US)

(72) Inventors: Louis Kelly Thomas, Kirkwood, MO (US); Joseph Marion Lancaster, St. Louis, MO (US)

(73) Assignee: IP Reservoir, LLC, Creve Coeur, MO (US)

( * ) Notice: Subject to any disclaimer, the term of this patent is extended or adjusted under 35 U.S.C. 154(b) by 982 days.

(21) Appl. No.: 15/336,961

(22) Filed: Oct. 28, 2016

(65) Prior Publication Data

US 2017/0124166 A1  May 4, 2017

Related U.S. Application Data

(60) Provisional application No. 62/248,117, filed on Oct. 29, 2015.

(51) Int. Cl.
| | | |
|---|---|---|
| *G06F 16/00* | (2019.01) | |
| *G06F 16/25* | (2019.01) | |
| *G06F 9/30* | (2018.01) | |
| *G06F 16/83* | (2019.01) | |
| *G06F 16/28* | (2019.01) | |

(Continued)

(52) U.S. Cl.
CPC .......... *G06F 16/258* (2019.01); *G06F 9/3001* (2013.01); *G06F 16/24568* (2019.01); *G06F 16/282* (2019.01); *G06F 16/83* (2019.01); *H04L 69/08* (2013.01); *H04L 69/22* (2013.01)

(58) Field of Classification Search
CPC ............ G06F 16/24568; G06F 16/258; G06F 16/282; G06F 16/83; G06F 9/3001
See application file for complete search history.

(56) References Cited

U.S. PATENT DOCUMENTS

| | | |
|---|---|---|
| 3,601,808 A | 8/1971 | Vlack |
| 3,611,314 A | 10/1971 | Pritchard, Jr. et al. |
| 3,729,712 A | 4/1973 | Glassman |

(Continued)

FOREIGN PATENT DOCUMENTS

| | | |
|---|---|---|
| EP | 0573991 | 12/1993 |
| EP | 0880088 | 11/1996 |

(Continued)

OTHER PUBLICATIONS

Dharmapurikar, "Fast and Scalable Pattern Matching for Content Filtering", ACM, ANCS 05, 2005, pp. 183-192.

(Continued)

*Primary Examiner* — Dinku W Gebresenbet
(74) *Attorney, Agent, or Firm* — Thompson Coburn LLP

(57) ABSTRACT

Improved computer technology is disclosed for enabling high performance stream processing on data such as complex, hierarchical data. In an example embodiment, a dynamic field schema specifies a dynamic field format for expressing the incoming data. An incoming data stream is then translated according to the dynamic field schema into an outgoing data stream in the dynamic field format. Stream processing, including field-specific stream processing, can then be performed on the outgoing data stream.

53 Claims, 16 Drawing Sheets

(51) Int. Cl.
*G06F 16/2455* (2019.01)
*H04L 29/06* (2006.01)

(56) References Cited

U.S. PATENT DOCUMENTS

| | | | |
|---|---|---|---|
| 3,824,375 A | 7/1974 | Gross et al. |
| 3,848,235 A | 11/1974 | Lewis et al. |
| 3,906,455 A | 9/1975 | Houston et al. |
| 4,081,607 A | 3/1978 | Vitols et al. |
| 4,298,898 A | 11/1981 | Cardot |
| 4,314,356 A | 2/1982 | Scarbrough |
| 4,385,393 A | 5/1983 | Chaure et al. |
| 4,464,718 A | 8/1984 | Dixon et al. |
| 4,550,436 A | 10/1985 | Freeman et al. |
| 4,823,306 A | 4/1989 | Barbic et al. |
| 4,941,178 A | 7/1990 | Chuang |
| 5,023,910 A | 6/1991 | Thomson |
| 5,050,075 A | 9/1991 | Herman et al. |
| 5,101,424 A | 3/1992 | Clayton et al. |
| 5,140,692 A | 8/1992 | Morita |
| 5,161,103 A | 11/1992 | Kosaka et al. |
| 5,163,131 A | 11/1992 | Row et al. |
| 5,179,626 A | 1/1993 | Thomson |
| 5,226,165 A | 7/1993 | Martin |
| 5,243,655 A | 9/1993 | Wang |
| 5,249,292 A | 9/1993 | Chiappa |
| 5,255,136 A | 10/1993 | Machado et al. |
| 5,263,156 A | 11/1993 | Bowen et al. |
| 5,265,065 A | 11/1993 | Turtle |
| 5,267,148 A | 11/1993 | Kosaka et al. |
| 5,313,560 A | 5/1994 | Maruoka et al. |
| 5,319,776 A | 6/1994 | Hile et al. |
| 5,327,521 A | 7/1994 | Savic et al. |
| 5,339,411 A | 8/1994 | Heaton, Jr. |
| 5,347,634 A | 9/1994 | Herrell et al. |
| 5,371,794 A | 12/1994 | Diffie et al. |
| 5,388,259 A | 2/1995 | Fleischman et al. |
| 5,396,253 A | 3/1995 | Chia |
| 5,404,411 A | 4/1995 | Banton et al. |
| 5,404,488 A | 4/1995 | Kerrigan et al. |
| 5,418,951 A | 5/1995 | Damashek |
| 5,421,028 A | 5/1995 | Swanson |
| 5,432,822 A | 7/1995 | Kaewell, Jr. |
| 5,440,723 A | 8/1995 | Arnold et al. |
| 5,461,712 A | 10/1995 | Chelstowski et al. |
| 5,463,701 A | 10/1995 | Kantner, Jr. et al. |
| 5,465,353 A | 11/1995 | Hull et al. |
| 5,481,735 A | 1/1996 | Mortensen et al. |
| 5,488,725 A | 1/1996 | Turtle et al. |
| 5,497,488 A | 3/1996 | Akizawa et al. |
| 5,517,642 A | 5/1996 | Bezek et al. |
| 5,544,352 A | 8/1996 | Egger |
| 5,546,578 A | 8/1996 | Takada et al. |
| 5,651,125 A | 7/1997 | Witt et al. |
| 5,687,297 A | 11/1997 | Coonan et al. |
| 5,701,464 A | 12/1997 | Aucsmith |
| 5,704,060 A | 12/1997 | Del Monte |
| 5,712,942 A | 1/1998 | Jennings et al. |
| 5,721,898 A | 2/1998 | Beardsley et al. |
| 5,740,466 A | 4/1998 | Geldman et al. |
| 5,774,835 A | 6/1998 | Ozawa et al. |
| 5,774,839 A | 6/1998 | Shlomot |
| 5,781,772 A | 7/1998 | Wilkinson, III et al. |
| 5,781,921 A | 7/1998 | Nichols |
| 5,805,832 A | 9/1998 | Brown et al. |
| 5,813,000 A | 9/1998 | Furlani |
| 5,819,273 A | 10/1998 | Vora et al. |
| 5,819,290 A | 10/1998 | Fujita et al. |
| 5,826,075 A | 10/1998 | Bealkowski et al. |
| 5,864,738 A | 1/1999 | Kessler et al. |
| 5,870,730 A | 2/1999 | Furuya et al. |
| 5,886,701 A | 3/1999 | Chauvin et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Händel |
| 5,978,801 A | 11/1999 | Yuasa |
| 5,987,432 A | 11/1999 | Zusman et al. |
| 5,991,881 A | 11/1999 | Conklin et al. |
| 5,995,963 A | 11/1999 | Nanba et al. |
| 6,006,264 A | 12/1999 | Colby et al. |
| 6,023,760 A | 2/2000 | Karttunen |
| 6,028,939 A | 2/2000 | Yin |
| 6,044,407 A | 3/2000 | Jones et al. |
| 6,058,391 A | 5/2000 | Gardner |
| 6,064,739 A | 5/2000 | Davis |
| 6,067,569 A | 5/2000 | Khaki et al. |
| 6,070,172 A | 5/2000 | Lowe |
| 6,073,160 A | 6/2000 | Grantham et al. |
| 6,105,067 A | 8/2000 | Batra |
| 6,134,551 A | 10/2000 | Aucsmith |
| 6,138,176 A | 10/2000 | McDonald et al. |
| RE36,946 E | 11/2000 | Diffie et al. |
| 6,147,976 A | 11/2000 | Shand et al. |
| 6,169,969 B1 | 1/2001 | Cohen |
| 6,175,874 B1 | 1/2001 | Imai et al. |
| 6,226,676 B1 | 5/2001 | Crump et al. |
| 6,236,980 B1 | 5/2001 | Reese |
| 6,279,113 B1 | 8/2001 | Vaidya |
| 6,317,795 B1 | 11/2001 | Malkin et al. |
| 6,336,150 B1 | 1/2002 | Ellis et al. |
| 6,339,819 B1 | 1/2002 | Huppenthal et al. |
| 6,370,645 B1 | 4/2002 | Lee et al. |
| 6,377,942 B1 | 4/2002 | Hinsley et al. |
| 6,381,242 B1 | 4/2002 | Maher, III et al. |
| 6,389,532 B1 | 5/2002 | Gupta et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,430,272 B1 | 8/2002 | Maruyama et al. |
| 6,456,632 B1 | 9/2002 | Baum et al. |
| 6,463,474 B1 | 10/2002 | Fuh et al. |
| 6,499,107 B1 | 12/2002 | Gleichauf et al. |
| 6,502,133 B1 | 12/2002 | Baulier et al. |
| 6,535,868 B1 | 3/2003 | Galeazzi et al. |
| 6,564,263 B1 | 5/2003 | Bergman et al. |
| 6,578,147 B1 | 6/2003 | Shanklin et al. |
| 6,625,150 B1 | 9/2003 | Yu |
| 6,704,816 B1 | 3/2004 | Burke |
| 6,711,558 B1 | 3/2004 | Indeck et al. |
| 6,765,918 B1 | 7/2004 | Dixon et al. |
| 6,772,345 B1 | 8/2004 | Shetty |
| 6,785,677 B1 | 8/2004 | Fritchman |
| 6,804,667 B1 | 10/2004 | Martin |
| 6,807,156 B1 | 10/2004 | Veres et al. |
| 6,839,686 B1 | 1/2005 | Galant |
| 6,850,906 B1 | 2/2005 | Chadha et al. |
| 6,870,837 B2 | 3/2005 | Ho et al. |
| 6,877,044 B2 | 4/2005 | Lo et al. |
| 6,886,103 B1 | 4/2005 | Brustoloni et al. |
| 6,901,461 B2 | 5/2005 | Bennett |
| 6,931,408 B2 | 8/2005 | Adams et al. |
| 6,931,545 B1 | 8/2005 | Ta et al. |
| 6,944,168 B2 | 9/2005 | Paatela et al. |
| 6,978,223 B2 | 12/2005 | Milliken |
| 6,980,976 B2 | 12/2005 | Alpha et al. |
| 6,981,054 B1 | 12/2005 | Krishna |
| 7,007,208 B1 | 2/2006 | Hibbert et al. |
| 7,019,674 B2 | 3/2006 | Cadambi et al. |
| 7,046,848 B1 | 5/2006 | Olcott |
| 7,093,023 B2 | 8/2006 | Lockwood et al. |
| 7,127,424 B2 | 10/2006 | Kemp, II et al. |
| 7,139,743 B2 | 11/2006 | Indeck et al. |
| 7,149,715 B2 | 12/2006 | Browne et al. |
| 7,167,980 B2 | 1/2007 | Chiu |
| 7,177,833 B1 | 2/2007 | Marynowski et al. |
| 7,181,437 B2 | 2/2007 | Indeck et al. |
| 7,181,608 B2 | 2/2007 | Fallon et al. |
| 7,222,114 B1 | 5/2007 | Chan et al. |
| 7,224,185 B2 | 5/2007 | Campbell et al. |
| 7,225,188 B1 | 5/2007 | Gai et al. |
| 7,251,629 B1 | 7/2007 | Marynowski et al. |
| 7,275,079 B2 * | 9/2007 | Brodsky ............ G06F 9/541 |
| | | 709/203 |

(56) References Cited

U.S. PATENT DOCUMENTS

| | | |
|---|---|---|
| 7,287,037 B2 | 10/2007 | An et al. |
| 7,305,383 B1 | 12/2007 | Kubesh et al. |
| 7,305,391 B2 | 12/2007 | Wyschogrod et al. |
| 7,363,277 B1 | 4/2008 | Dutta et al. |
| 7,386,564 B2 | 6/2008 | Abdo et al. |
| 7,408,932 B2 | 8/2008 | Kounavis et al. |
| 7,411,957 B2 | 8/2008 | Stacy et al. |
| 7,420,931 B2 | 9/2008 | Nanda et al. |
| 7,433,878 B2 | 10/2008 | Mika |
| 7,444,515 B2 | 10/2008 | Dharmapurikar et al. |
| 7,454,418 B1 | 11/2008 | Wang |
| 7,457,834 B2 | 11/2008 | Jung et al. |
| 7,461,064 B2 | 12/2008 | Fontoura et al. |
| 7,467,155 B2 | 12/2008 | McCool et al. |
| 7,478,431 B1 | 1/2009 | Nachenberg |
| 7,480,253 B1 | 1/2009 | Allan |
| 7,487,327 B1 | 2/2009 | Chang et al. |
| 7,496,108 B2 | 2/2009 | Biran et al. |
| 7,552,107 B2 | 6/2009 | Indeck et al. |
| 7,558,925 B2 | 7/2009 | Bouchard et al. |
| 7,565,525 B2 | 7/2009 | Vorbach et al. |
| 7,636,703 B2 | 12/2009 | Taylor |
| 7,660,793 B2 | 2/2010 | Indeck et al. |
| 7,680,790 B2 | 3/2010 | Indeck et al. |
| 7,685,121 B2 | 3/2010 | Brown et al. |
| 7,685,254 B2 | 3/2010 | Pandya |
| 7,701,945 B2 | 4/2010 | Roesch et al. |
| 7,702,629 B2 | 4/2010 | Cytron et al. |
| 7,783,862 B2 | 8/2010 | Cameron |
| 7,805,392 B1 | 9/2010 | Steele et al. |
| 7,840,482 B2 | 11/2010 | Singla et al. |
| 7,917,299 B2 | 3/2011 | Buhler et al. |
| 7,921,046 B2 | 4/2011 | Parsons et al. |
| 7,945,528 B2 | 5/2011 | Cytron et al. |
| 7,949,650 B2 | 5/2011 | Indeck et al. |
| 8,051,195 B1 | 11/2011 | Kandekar et al. |
| 8,095,508 B2 | 1/2012 | Chamberlain et al. |
| 8,275,885 B2 | 9/2012 | Hu et al. |
| 8,374,986 B2 | 2/2013 | Indeck et al. |
| 8,407,588 B1 | 3/2013 | Hu et al. |
| 8,620,881 B2 | 12/2013 | Chamberlain et al. |
| 8,751,452 B2 | 6/2014 | Chamberlain et al. |
| 8,768,888 B2 | 7/2014 | Chamberlain et al. |
| 9,176,775 B2 | 11/2015 | Chamberlain et al. |
| 9,633,093 B2 | 4/2017 | Henrichs et al. |
| 9,633,097 B2 | 4/2017 | Tidwell et al. |
| 10,102,260 B2 | 10/2018 | Lancaster et al. |
| 10,133,802 B2 | 11/2018 | Lancaster et al. |
| 10,146,845 B2 | 12/2018 | Henrichs et al. |
| 10,158,377 B2 | 12/2018 | Indeck et al. |
| 10,411,734 B2 | 9/2019 | Indeck et al. |
| 10,621,192 B2 | 4/2020 | Henrichs et al. |
| 2001/0013048 A1 | 8/2001 | Imbert de Tremiolles et al. |
| 2001/0014093 A1 | 8/2001 | Yoda et al. |
| 2001/0052038 A1 | 12/2001 | Fallon et al. |
| 2001/0056547 A1 | 12/2001 | Dixon |
| 2002/0031125 A1 | 3/2002 | Sato |
| 2002/0069370 A1 | 6/2002 | Mack |
| 2002/0091691 A1 | 7/2002 | Sharp |
| 2002/0095512 A1 | 7/2002 | Rana et al. |
| 2002/0103663 A1 | 8/2002 | Bankier et al. |
| 2002/0105911 A1 | 8/2002 | Pruthi et al. |
| 2002/0129140 A1 | 9/2002 | Peled et al. |
| 2002/0150248 A1 | 10/2002 | Kovacevic |
| 2002/0162025 A1 | 10/2002 | Sutton et al. |
| 2002/0166063 A1 | 11/2002 | Lachman et al. |
| 2003/0009693 A1 | 1/2003 | Brock et al. |
| 2003/0014521 A1 | 1/2003 | Elson et al. |
| 2003/0014662 A1 | 1/2003 | Gupta et al. |
| 2003/0018630 A1 | 1/2003 | Indeck et al. |
| 2003/0023876 A1 | 1/2003 | Bardsley et al. |
| 2003/0037037 A1 | 2/2003 | Adams et al. |
| 2003/0043805 A1 | 3/2003 | Graham et al. |
| 2003/0051043 A1 | 3/2003 | Wyschogrod et al. |
| 2003/0065943 A1 | 4/2003 | Geis et al. |
| 2003/0074582 A1 | 4/2003 | Patel et al. |
| 2003/0110229 A1 | 6/2003 | Kulig et al. |
| 2003/0115485 A1 | 6/2003 | Milliken |
| 2003/0163715 A1 | 8/2003 | Wong |
| 2003/0169877 A1 | 9/2003 | Liu et al. |
| 2003/0177253 A1 | 9/2003 | Schuehler et al. |
| 2003/0221013 A1 | 11/2003 | Lockwood et al. |
| 2004/0019703 A1 | 1/2004 | Burton |
| 2004/0028047 A1 | 2/2004 | Hou et al. |
| 2004/0049596 A1 | 3/2004 | Schuehler et al. |
| 2004/0054924 A1 | 3/2004 | Chuah et al. |
| 2004/0064737 A1 | 4/2004 | Milliken et al. |
| 2004/0100977 A1 | 5/2004 | Suzuki et al. |
| 2004/0111632 A1 | 6/2004 | Halperin |
| 2004/0117645 A1 | 6/2004 | Okuda et al. |
| 2004/0153813 A1 | 8/2004 | Swoboda |
| 2004/0162826 A1 | 8/2004 | Wyschogrod et al. |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0196905 A1 | 10/2004 | Yamane et al. |
| 2004/0199448 A1 | 10/2004 | Chalermkraivuth et al. |
| 2004/0205149 A1 | 10/2004 | Dillon et al. |
| 2005/0005145 A1 | 1/2005 | Teixeira |
| 2005/0086520 A1 | 4/2005 | Dharmapurikar et al. |
| 2005/0113025 A1 | 5/2005 | Akamatsu et al. |
| 2005/0131790 A1 | 6/2005 | Benzschawel et al. |
| 2005/0175010 A1 | 8/2005 | Wilson et al. |
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0187974 A1 | 8/2005 | Gong |
| 2005/0195832 A1 | 9/2005 | Dharmapurikar et al. |
| 2005/0229254 A1 | 10/2005 | Singh et al. |
| 2006/0020715 A1 | 1/2006 | Jungck |
| 2006/0031154 A1 | 2/2006 | Noviello et al. |
| 2006/0031156 A1 | 2/2006 | Noviello et al. |
| 2006/0031263 A1 | 2/2006 | Arrouye et al. |
| 2006/0031737 A1 | 2/2006 | Chugg et al. |
| 2006/0036693 A1 | 2/2006 | Hulten et al. |
| 2006/0047636 A1 | 3/2006 | Mohania et al. |
| 2006/0053295 A1 | 3/2006 | Madhusudan et al. |
| 2006/0059213 A1 | 3/2006 | Evoy |
| 2006/0129745 A1 | 6/2006 | Thiel et al. |
| 2006/0198375 A1 | 9/2006 | Baik et al. |
| 2006/0242123 A1 | 10/2006 | Williams, Jr. |
| 2006/0259417 A1 | 11/2006 | Marynowski et al. |
| 2006/0269148 A1 | 11/2006 | Farber et al. |
| 2006/0294059 A1 | 12/2006 | Chamberlain et al. |
| 2007/0011175 A1 | 1/2007 | Langseth et al. |
| 2007/0011183 A1 | 1/2007 | Langseth et al. |
| 2007/0011317 A1 | 1/2007 | Brandyburg et al. |
| 2007/0011687 A1 | 1/2007 | Ilik et al. |
| 2007/0061594 A1 | 3/2007 | Ginter et al. |
| 2007/0067108 A1 | 3/2007 | Buhler et al. |
| 2007/0067481 A1 | 3/2007 | Sharma et al. |
| 2007/0078837 A1 | 4/2007 | Indeck et al. |
| 2007/0094199 A1 | 4/2007 | Deshpande et al. |
| 2007/0112748 A1 | 5/2007 | Angell et al. |
| 2007/0112837 A1 | 5/2007 | Houh et al. |
| 2007/0118500 A1 | 5/2007 | Indeck et al. |
| 2007/0130140 A1 | 6/2007 | Cytron et al. |
| 2007/0156574 A1 | 7/2007 | Marynowski et al. |
| 2007/0156669 A1 | 7/2007 | Marchisio et al. |
| 2007/0174841 A1 | 7/2007 | Chamberlain et al. |
| 2007/0179935 A1 | 8/2007 | Lee et al. |
| 2007/0209068 A1 | 9/2007 | Ansari et al. |
| 2007/0237327 A1 | 10/2007 | Taylor et al. |
| 2007/0244859 A1 | 10/2007 | Trippe et al. |
| 2007/0260602 A1 | 11/2007 | Taylor |
| 2007/0277036 A1 | 11/2007 | Chamberlain et al. |
| 2007/0294157 A1 | 12/2007 | Singla et al. |
| 2008/0005062 A1 | 1/2008 | Gupta et al. |
| 2008/0021874 A1 | 1/2008 | Dahl et al. |
| 2008/0023655 A1 | 1/2008 | Sakamoto et al. |
| 2008/0030383 A1 | 2/2008 | Cameron |

(56) References Cited

U.S. PATENT DOCUMENTS

| | | | |
|---|---|---|---|
| 2008/0040657 A1 | 2/2008 | Kuznetsov et al. | |
| 2008/0077582 A1 | 3/2008 | Reed | |
| 2008/0084573 A1 | 4/2008 | Horowitz et al. | |
| 2008/0086274 A1 | 4/2008 | Chamberlain et al. | |
| 2008/0104542 A1 | 5/2008 | Cohen et al. | |
| 2008/0109413 A1 | 5/2008 | Indeck et al. | |
| 2008/0114724 A1 | 5/2008 | Indeck et al. | |
| 2008/0114725 A1 | 5/2008 | Indeck et al. | |
| 2008/0114760 A1 | 5/2008 | Indeck et al. | |
| 2008/0126320 A1 | 5/2008 | Indeck et al. | |
| 2008/0133453 A1 | 6/2008 | Indeck et al. | |
| 2008/0133519 A1 | 6/2008 | Indeck et al. | |
| 2008/0243675 A1 | 10/2008 | Parsons et al. | |
| 2008/0307435 A1 | 12/2008 | Rehman | |
| 2009/0002379 A1* | 1/2009 | Baeza | G06T 1/20 345/522 |
| 2009/0007197 A1 | 1/2009 | Turner | |
| 2009/0182683 A1 | 7/2009 | Taylor et al. | |
| 2009/0262741 A1 | 10/2009 | Jungck et al. | |
| 2009/0287628 A1 | 11/2009 | Indeck et al. | |
| 2009/0300054 A1 | 12/2009 | Fisher et al. | |
| 2010/0088590 A1* | 4/2010 | Bajohr | G06F 40/166 715/235 |
| 2010/0094858 A1 | 4/2010 | Indeck et al. | |
| 2010/0145902 A1 | 6/2010 | Boyan et al. | |
| 2010/0198850 A1 | 8/2010 | Cytron et al. | |
| 2010/0284532 A1 | 11/2010 | Burnett et al. | |
| 2011/0040701 A1 | 2/2011 | Singla et al. | |
| 2011/0078109 A1 | 3/2011 | Griggs et al. | |
| 2011/0123021 A1 | 5/2011 | Tepper | |
| 2012/0114119 A1 | 5/2012 | Ahuja et al. | |
| 2012/0311411 A1 | 12/2012 | Kirkpatrick | |
| 2013/0151458 A1 | 6/2013 | Indeck et al. | |
| 2013/0232228 A1* | 9/2013 | Ramamurthy | H04L 65/80 709/219 |
| 2014/0114908 A1 | 4/2014 | Henrichs et al. | |
| 2014/0114929 A1 | 4/2014 | Henrichs et al. | |
| 2014/0250393 A1 | 9/2014 | Goodson | |
| 2014/0279864 A1 | 9/2014 | Lopyrev et al. | |
| 2015/0095109 A1* | 4/2015 | Kodde | G06Q 40/04 705/7.29 |
| 2015/0134670 A1* | 5/2015 | Liu | G06F 16/20 707/741 |
| 2015/0310077 A1 | 10/2015 | Lancaster et al. | |
| 2015/0310078 A1 | 10/2015 | Lancaster et al. | |
| 2015/0310087 A1 | 10/2015 | Tidwell et al. | |
| 2017/0123866 A1 | 5/2017 | Indeck et al. | |
| 2017/0220655 A1 | 8/2017 | Henrichs et al. | |
| 2019/0079984 A1 | 3/2019 | Lancaster et al. | |
| 2019/0108177 A1 | 4/2019 | Henrichs et al. | |
| 2019/0123764 A1 | 4/2019 | Indeck et al. | |
| 2020/0007157 A1 | 1/2020 | Indeck et al. | |
| 2020/0242126 A1 | 7/2020 | Henrichs et al. | |

FOREIGN PATENT DOCUMENTS

| | | |
|---|---|---|
| EP | 0851358 A | 7/1998 |
| EP | 0887723 | 12/1998 |
| EP | 0911738 A | 4/1999 |
| JP | 02136900 A | 5/1990 |
| JP | 03014075 A | 1/1991 |
| JP | 09145544 A | 6/1997 |
| JP | 2000286715 A | 10/2000 |
| JP | 2001357048 A | 12/2001 |
| JP | 2002101089 A | 4/2002 |
| WO | 199010910 | 9/1990 |
| WO | 1994/09443 A1 | 4/1994 |
| WO | 199737735 | 10/1997 |
| WO | 199905814 | 2/1999 |
| WO | 2000041136 A1 | 7/2000 |
| WO | 2001022425 A | 3/2001 |
| WO | 2001039577 | 6/2001 |
| WO | 2001061913 | 8/2001 |
| WO | 2001080082 A2 | 10/2001 |
| WO | 2001080558 | 10/2001 |
| WO | 2002061525 | 8/2002 |
| WO | 2002082271 | 10/2002 |
| WO | 2003100650 | 4/2003 |
| WO | 2003036845 | 5/2003 |
| WO | 2004017604 | 2/2004 |
| WO | 2004042560 A | 5/2004 |
| WO | 2004042561 A | 5/2004 |
| WO | 2004042562 | 5/2004 |
| WO | 2004042574 A | 5/2004 |
| WO | 2005017708 A | 2/2005 |
| WO | 2005026925 | 3/2005 |
| WO | 2005048134 A | 5/2005 |
| WO | 2006023948 | 3/2006 |
| WO | 2006096324 | 9/2006 |
| WO | 2007064685 | 6/2007 |
| WO | 2007087507 | 8/2007 |
| WO | 2008063973 | 5/2008 |
| WO | 2008063974 | 5/2008 |
| WO | 2009029842 | 3/2009 |
| WO | 2009089467 A2 | 7/2009 |
| WO | 2009140363 A1 | 11/2009 |
| WO | 2014/066416 A2 | 5/2014 |
| WO | 2015/164639 | 10/2015 |

OTHER PUBLICATIONS

Ebeling et al., "RaPiD—Reconfigurable Pipelined Datapath", University of Washington, Dept. of Computer Science and Engineering, Sep. 23, 1996, Seattle, WA.

Exegy Inc., "Exegy and HyperFeed to Unveil Exelerate TP at SIA Conference", Release Date: Jun. 20, 2006, downloaded from http://news.thomasnet.com/companystory/488004 on Jun. 19, 2007, 4 pages.

Exegy Inc., "First Exegy Ticker Plant Deployed", Release Date: Oct. 17, 2006, downloaded from http://news.thomasnet.com/companystory/496530 on Jun. 19, 2007, 5 pages.

Feldman, "High Frequency Traders Get Boost From FPGA Acceleration", Jun. 8, 2007, downloaded from http://www.hpcwire.com/hpc.1600113.html on Jun. 19, 2007, 4 pages.

Feldmann, "BLT: Bi-Layer Tracing of HTTP and TCP/IP", AT&T Labs-Research, Florham Park, NJ, USA.

Fernandez, "Template Matching of Binary Targets in Grey-Scale Images: A Nonparametric Approach", Pattern Recognition, 1997, pp. 1175-1182, vol. 30, No. 7.

Forgy, "RETE: A Fast Algorithm for the Many Pattern/Many Object Pattern Matching Problem", Artificial Intelligence, 1982, pp. 17-37, vol. 19.

Franklin et al., "An Architecture for Fast Processing of Large Unstructured Data Sets." Proc. of 22nd Int'l Conf. on computer Design, Oct. 2004, pp. 280-287.

Franklin et al., "Assisting Network Intrusion Detection with Reconfigurable Hardware", Symposium on Field-Programmable Custom Computing Machines (FCCM 2002), Apr. 2002, Napa, California.

Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.

Gavrila et al., "Multi-feature Hierarchical Template Matching Using Distance Transforms", IEEE, Aug. 16-20, 1998, vol. 1, pp. 439-444.

Google Search Results Page for "field programmable gate array financial calculation stock market" over dates of Jan. 1, 1990-May 21, 2002, 1 page.

Guerdoux-Jamet et al., "Systolic Filter for Fast DNA Similarity Search", IEEE, 1995, pp. 145-156.

Gunther et al., "Assessing Document Relevance with Run-Time Reconfigurable Machines", FPGAs for Custom Computing Machines, 1996, Proceedings, IEEE Symposium on, pp. 10-17, Napa Valley, CA, Apr. 17, 1996.

Gupta et al., "High-Speed Implementations of Rule-Based Systems," ACM Transactions on Computer Systems, May 1989, pp. 119-146, vol. 7, Issue 2.

Gupta et al., "Packet Classification on Multiple Fields", Computer Systems Laboratory, Stanford University, Stanford, CA.

(56) References Cited

OTHER PUBLICATIONS

Gupta et al., "PMM: A Parallel Architecture for Production Systems," Proceedings of the IEEE, Apr 1992, pp. 693-696, vol. 2.

Gurtov, "Effect of Delays on TCP Performance", Cellular Systems Development, Sonera Corporation, online at http://cs.helsinki.fi/u/gurtov/papers/pwc01.pdf.

Gyang, "NCBI BLASTN Stage 1 in Reconfigurable Hardware," Technical Report WUCSE-2005-30, Aug. 2004, Department of Computer Science and Engineering, Washington University, St. Louis, MO.

Halaas et al., "A Recursive MISD Architecture for Pattern Matching", IEEE Transactions on Very Large Scale Integration, vol. 12, No. 7, pp. 727-734, Jul. 2004.

Harris, "Pete's Blog: Can FPGAs Overcome the FUD?", Low-Latency.com, May 14, 2007, URL: http://www.a-teamgroup.com/article/pete-blog-can-fpgas-overcome-the-fud/.

Hauck et al., "Software Technologies for Reconfigurable Systems", Northwestern University, Dept. of ECE, Technical Report, 1996.

Hayes, "Computer Architecture and Organization", Second Edition, 1988, pp. 448-459, McGraw-Hill, Inc.

Herbordt et al., "Single Pass, BLAST-Like, Approximate String Matching on FPGAs", 14th Annual IEEE Symposium on Field-Programmable Custom Computing Machines (FCCM'06), Apr. 2006, pp. 1-10, IEEE.

Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.

Hirsch, "Tech Predictions for 2008", Reconfigurable Computing, Jan. 16, 2008, URL: http://fpgacomputing.blogspot.com/2008_01_01_archive.html.

Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.

Hutchings et al., "Assisting Network Intrusion Detection with Reconfigurable Hardware", FCCM 2002: 10th Annual IEEE Symposium on Field-Programmable Custom Computing Machines, 2002.

Jacobson et al., "RFC 1072: TCP Extensions for Long-Delay Paths", Oct. 1988.

Jacobson et al., "tcpdump—dump traffic on a network", Jun. 30, 1997, online at www.cse.cuhk.edu.hk/~cslui/CEG4430/tcpdump.ps.gz.

Johnson et al., "Pattern Matching in Reconfigurable Logic for Packet Classification", College of Computing, Georgia Institute of Technology, Atlanta, GA.

Jones et al., "A Probabilistic Model of Information Retrieval: Development and Status", Information Processing and Management, Aug. 1998, 76 pages.

Keutzer et al., "A Survey of Programmable Platforms—Network Proc", University of California-Berkeley, pp. 1-29.

Koloniari et al., "Content-Based Routing of Path Queries in Peer-to-Peer Systems", pp. 1-19, E Bertino et al. (Eds.): EDBT 2004, LNCS 2992, pp. 29-47, 2004, copyright by Springer-Verlag, Germany.

Krishnamurthy et al., "Biosequence Similarity Search on the Mercury System", Proceedings of the 15th IEEE International Conference on Application-Specific Systems, Architectures, and Processors (ASAP04), Sep. 2004, pp. 365-375.

Kulig et al., "System and Method for Controlling Transmission of Data Packets Over an Information Network", pending U.S. Patent Application.

Lancaster et al., "Acceleration of Ungapped Extension in Mercury BLAST", Seventh (7th) Workshop on Media and Streaming Processors, Nov. 12, 2005, Thirty-Eighth (38th) International Symposium on Microarchitecture (MICRO-38), Barcelona, Spain.

Li et al., "Large-Scale IP Traceback in High-Speed Internet: Practical Techniques and Theoretical Foundation", Proceedings of the 2004 IEEE Symposium on Security and Privacy, 2004, pp. 1-15.

Lin et al., "Real-Time Image Template Matching Based on Systolic Array Processor", International Journal of Electronics; Dec. 1, 1992; pp. 1165-1176; vol. 73, No. 6; London, Great Britain.

Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.

Lockwood et al., "Hello, World: A Simple Application for the Field Programmable Port Extender (FPX)", Washington University, Department of Computer Science, Technical Report WUCS-00-12, Jul. 11, 2000.

Lockwood et al., "Parallel FPGA Programming over Backplane Chassis", Washington University, Department of Computer Science, Technical Report WUCS-00-11, Jun. 12, 2000.

Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.

Lockwood, "An Open Platform for Development of Network Processing Modules in Reprogrammable Hardware", IEC DesignCon 2001, Santa Clara, CA, Jan. 2001, Paper WB-19.

Lockwood, "Building Networks with Reprogrammable Hardware", Field Programmable Port Extender: Jan. 2002 Gigabit Workshop Tutorial, Washington University, St. Louis, MO, Jan. 3-4, 2002.

Lockwood, "Evolvable Internet Hardware Platforms", NASA/DoD Workshop on Evolvable Hardware (EHW'01), Long Beach, CA, Jul. 12-14, 2001, pp. 271-279.

"A Reconfigurable Computing Model for Biological Research Application of Smith-Waterman Analysis to Bacterial Genomes" A White Paper Prepared by Star Bridge Systems, Inc. [retrieved Dec. 12, 2006]. Retrieved from the Internet: <URL: http://www.starbridgesystems.com/resources/whitepapers/Smith%20Waterman%20Whitepaper.pdf.

"ACTIV Financial Announces Hardware Based Market Data Feed Processing Strategy", for Release on Apr. 2, 2007, 2 pages.

"ACTIV Financial Delivers Accelerated Market Data Feed", Apr. 6, 2007, byline of Apr. 2, 2007, downloaded from http://hpcwire.com/hpc.1346816.html on Jun. 19, 2007, 3 pages.

"DRC, Exegy Announce Joint Development Agreement", Jun. 8, 2007, byline of Jun. 4, 2007; downloaded from http://www.hpcwire.com/hpc/1595644.html on Jun. 19, 2007, 3 pages.

"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.

"Overview, Field Programmable Port Extender", Jan. 2002 Gigabit Workshop Tutorial, Washington University, St. Louis, MO, Jan. 3-4, 2002, pp. 1-4.

"Payload Plus™ Agere System Interface", Agere Systems Product Brief, Jun. 2001, downloaded from Internet, Jan. 2002, pp. 1-6.

"RFC793: Transmission Control Protocol, Darpa Internet Program, Protocol Specification", Sep. 1981.

"Technology Overview", Data Search Systems Incorporated, downloaded from the http://www.datasearchsystems.com/tech.htm on Apr. 19, 2004.

"The Field-Programmable Port Extender (FPX)", downloaded from http://www.arl.wustl.edu/arl/ in Mar. 2002.

Aldwairi et al., "Configurable String Matching Hardware for Speeding up Intrusion Detection", SIRARCH Comput. Archit. News, vol. 33, No. 1, pp. 99-107, Mar. 2005.

Amanuma et al., "A FPGA Architecture for High Speed Computation", Proceedings of 60th Convention Architecture, Software Science, Engineering, Mar. 14, 2000, pp. 1-163-1-164, Information Processing Society, Japan.

Amer-Yahia et al., "XQuery 1.0 and XPath 2.0 Full-Text 1.0", W3C Working Draft, http://www.w3.org/TR/query-full-text/, May 18, 2007—parts 1-4.

Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.

(56) References Cited

OTHER PUBLICATIONS

Anonymous, "Method for Allocating Computer Disk Space to a File of Known Size", IBM Technical Disclosure Bulletin, vol. 27, No. 10B, Mar. 1, 1985, New York.
Arnold et al., "The Splash 2 Processor and Applications", Proceedings 1993 IEEE International Conference on Computer Design: VLSI in Computers and Processors (ICCD '93), Oct. 3, 1993, pp. 482-485, IEEE Computer Society, Cambridge, MA USA.
Artan et al., "Multi-packet Signature Detection using Prefix Bloom Filters", 2005, IEEE, pp. 1811-1816.
Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.
Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf.
Baer, "Computer Systems Architecture", 1980, pp. 262-265; Computer Science Press, Potomac, Maryland.
Baeza-Yates et al., "New and Faster Filters for Multiple Approximate String Matching", Random Structures and Algorithms (RSA), Jan. 2002, pp. 23-49, vol. 20, No. 1.
Baker et al., "High-throughput Linked-Pattern Matching for Intrusion Detection Systems", ANCS 2005: Proceedings of the 2005 Symposium on Architecture for Networking and Communications Systems, pp. 193-202, ACM Press, 2005.
Barone-Adesi et al., "Efficient Analytic Approximation of American Option Values", Journal of Finance, vol. 42, No. 2 (Jun. 1987), pp. 301-320.
Behrens et al., "BLASTN Redundancy Filter in Reprogrammable Hardware," Final Project Submission, Fall 2003, Department of Computer Science and Engineering, Washington University.
Berk, "JLex: A lexical analyzer generator for Java™", downloaded from http://www.cs.princeton.edu/~appel/modern/java/Jlex/ in Jan. 2002, pp. 1-18.
Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.
Braun et al., "Layered Protocol Wrappers for Internet Packet Processing in Reconfigurable Hardware", Proceedings of Hot Interconnects 9 (Hotl-9) Stanford, CA, Aug. 22-24, 2001, pp. 93-98.
Braun et al., "Protocol Wrappers for Layered Network Packet Processing in Reconfigurable Hardware", IEEE Micro, Jan.-Feb. 2002, pp. 66-74.
Brodie et al., "Dynamic Reconfigurable Computing", in Proc. of 9th Military and Aerospace Programmable Logic Devices International Conference, Sep. 2006.
Cavnar et al., "N-Gram-Based Text Categorization", Proceedings of SDAIR-94, 3rd Annual Symposium on Document Analysis and Information Retrieval, Las Vegas, pp. 161-175, 1994.
Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.
Chamberlain et al., "The Mercury System: Embedding Computation Into Disk Drives", 7th High Performance Embedded Computing Workshop, Sep. 2003, Boston, MA.
Chaney et al., "Design of a Gigabit ATM Switch", Washington University, St. Louis.
Cho et al., "Deep Packet Filter with Dedicated Logic and Read Only Memories", 12th Annual IEEE Symposium on Field-Programmable Custom Computing Machines, Apr. 2004.
Cho, "A Fast Regular Expression Indexing Engine", Proc. of 18th Int'l Conv. on Data Engineering, 2001, pp. 1-12.
Choi et al., "Design of a Flexible Open Platform for High Performance Active Networks", Allerton Conference, 1999, Champaign, IL.
Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.
Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.
Compton et al., "Configurable Computing: A Survey of Systems and Software", Technical Report, Northwestern University, Dept. of ECE, 1999.
Compton et al., "Reconfigurable Computing: A Survey of Systems and Software", Technical Report, Northwestern University, Dept. of ECE, 1999, presented by Yi-Gang Tai.
Cong et al., "An Optional Technology Mapping Algorithm for Delay Optimization in Lookup-Table Based FPGA Designs", IEEE, 1992, pp. 48-53.
Crosman, "Who Will Cure Your Data Latency?", Storage & Servers, Jun. 20, 2007, URL: http://www.networkcomputing.com/article/printFullArticleSrc.jhtml?article ID=199905630.
Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.
Denoyer et al., "HMM-based Passage Models for Document Classification and Ranking", Proceedings of ECIR-01, 23rd European Colloquim Information Retrieval Research, Darmstatd, DE, pp. 126-135, 2001.
Department of Computer Science & Engineering; "Technical Reports"; Publication (http://cse.seas.wustl.edu/Research/Publications.asp); Dec. 17, 2007; pp. 1-26; Washington University in St. Louis.
Dharmapurikar et al., "Deep Packet Inspection Using Parallel Bloom Filters," IEEE Micro, Jan.-Feb. 2004, vol. 24, Issue: 1, pp. 52-61.
Dharmapurikar et al., "Deep Packet Inspection Using Parallel Bloom Filters," Symposium on High Performance Interconnects (Hotl), Stanford, California, 2003, pp. 44-51.
Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.
Dharmapurikar et al., "Longest Prefix Matching Using Bloom Filters," SIGCOMM, 2003, pp. 201-212.
Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.
Lockwood, "Hardware Laboratory Configuration", Field Programmable Port Extender: Jan. 2002 Gigabit Workshop Tutorial, Washington University, St. Louis, MO, Jan. 3-4, 2002.
Lockwood, "Introduction", Field Programmable Port Extender: Jan. 2002 Gigabit Workshop Tutorial, Washington University, St. Louis, MO, Jan. 3-4, 2002.
Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.
Lockwood, "Protocol Processing on the FPX", Field Programmable Port Extender: Jan. 2002 Gigabit Workshop Tutorial, Washington University, St. Louis, MO, Jan. 3-4, 2002.
Lockwood, "Simulation and Synthesis", Field Programmable Port Extender: Jan. 2002 Gigabit Workshop Tutorial, Washington University, St. Louis, MO, Jan. 3-4, 2002.
Lockwood, "Simulation of the Hello World Application for the Field-Programmable Port Extender (FPX)", Washington University, Applied Research Lab, Spring 2001 Gigabits Kits Workshop.
Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.

(56) References Cited

OTHER PUBLICATIONS

Madhusudan, "Design of a System for Real-Time Worm Detection", Power Point Presentation in Support of Master's Thesis, Washington Univ., Dept. of Computer Science and Engineering, St. Louis, MO, Aug. 2004.

Mao et al., "Cluster-based Online Monitoring System of Web Traffic", Dept. of Computer Science and Technology, Tsinghua Univ., Bejing, 100084 P.R. China.

Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.

Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.

Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.

Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.

Navarro, "A Guided Tour to Approximate String Matching", ACM Computing Surveys, vol. 33, No. 1, Mar. 2001, pp. 31-88.

Necker et al., "TCP-Stream Reassembly and State Tracking in Hardware", School of Electrical and Computer Engineering, Georgia Institute of Technology, Atlanta, GA.

Niewczas et al., "A Pattern Matching Algorithm for Verification and Analysis of Very Large IC Layouts", ACM, Apr. 1998, pp. 129-134.

Nunez et al., "The X-MatchLITE FPGA-Based Data Compressor", Euromicro Conference 1999, Proceedings, Italy, Sep. 8-10, 1999, pp. 126-132, Los Alamitos, CA.

Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.

Prakash et al., "OC-3072 Packet Classification Using BDDs and Pipelined SRAMs", Department of Electrical and Computer Engineering, The University of Texas at Austin.

Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.

Prosecution History for U.S. Appl. No. 14/060,313, now U.S. Pat. No. 9,633,093, filed Oct. 22, 2013 (Henrichs et al.).

Prosecution History for U.S. Appl. No. 14/060,339, filed Oct. 22, 2013 (Henrichs et al.).

Prosecution History for U.S. Appl. No. 14/694,580, filed Apr. 23, 2015 (Lancaster et al.).

Prosecution History for U.S. Appl. No. 14/694,595, filed Apr. 23, 2015 (Lancaster et al.).

Prosecution History of U.S. Appl. No. 14/694,622, now U.S. Pat. No. 9,633,097, filed Apr. 23, 2015 (Tidwell et al.).

Ramakrishna et al., "A Performance Study of Hashing Functions for Hardware Applications", Int. Conf. on Computing and Information, May 1994, pp. 1621-1636, vol. 1, No. 1.

Ramakrishna et al., "Efficient Hardware Hashing Functions for High Performance Computers", IEEE Transactions on Computers, Dec. 1997, vol. 46, No. 12.

Ramesh et al., "Automatic Selection of Tuning Parameters for Feature Extraction Sequences", IEEE, Jun. 21-23, 1994, pp. 672-677.

Ratha et al., "Convolution on Splash 2", Proceedings of IEEE Symposium on Fpgas for Custom Computing Machines, Apr. 19, 1995, pp. 204-213, Los Alamitos, California.

Ratha et al., "FPGA-based coprocessor for text string extraction", IEEE, Sep. 11-13, 2000, pp. 217-221.

Roberts, "Internet Still Growing Dramatically Says Internet Founder", Press Release, Caspian Networks, Inc.—Virtual Pressroom.

Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.

Roy, "A bounded search algorithm for segmented channel routing for FPGA's and associated channel architecture issues", IEEE, Nov. 11, 1993, pp. 1695-1705, vol. 12.

Sachin Tandon, "A Programmable Architecture for Real-Time Derivative Trading", Master's Thesis, University of Edinburgh, 2003.

Schmerken, "With Hyperfeed Litigation Pending, Exegy Launches Low-Latency Ticker Plant", in Wall Street & Technology Blog, Mar. 20, 2007, pp. 1-2.

Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.

Schuehler et al., "Architecture for a Hardware Based, TCP/IP Content Scanning System", IEEE Micro, 24(1):62-69, Jan.-Feb. 2004, USA.

Schuehler et al., "TCP-Splitter: A TCP/IP Flow Monitor in Reconfigurable Hardware", Hot Interconnects 10 (Hotl-10), Stanford, CA, Aug. 21-23, 2002, pp. 127-131.

Seki et al., "High Speed Computation of Shogi With FPGA", Proceedings of 58th Convention Architecture, Software Science, Engineering, Mar. 9, 1999, pp. 1-133-1-134.

Shah, "Understanding Network Processors", Version 1.0, University of California-Berkeley, Sep. 4, 2001.

Shalunov et al., "Bulk TCP Use and Performance on Internet 2", ACM SIGCOMM Internet Measurement Workshop, 2001.

Shirazi et al., "Quantitative Analysis of FPGA-based Database Searching", Journal of VLSI Signal Processing Systems for Signal, Image, and Video Technology, May 2001, pp. 85-96, vol. 28, No. 1/2, Kluwer Academic Publishers, Dordrecht, NL.

Sidhu et al., "Fast Regular Expression Matching Using FPGAs", IEEE Symposium on Field Programmable Custom Computing Machines (FCCM 2001), Apr. 2001.

Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.

Singh et al., "The EarlyBird System for Real-Time Detection on Unknown Worms", Technical report CS2003-0761, Aug. 2003.

Sourdis and Pnevmatikatos, "Fast, Large-Scale String Match for a 10Gbps FPGA-based Network Intrusion Detection System", 13th International Conference on Field Programmable Logic and Applications, 2003.

Steinbach et al., "A Comparison of Document Clustering Techniques", KDD Workshop on Text Mining, 2000.

Tan et al., "A High Throughput String Matching Architecture for Intrusion Detection and Prevention", ISCA 2005: 32nd Annual International Symposium on Computer Architecture, pp. 112-122, 2005.

Tang et al., "A Novel Data Format Conversion Method Based on FPGA", Cross Strait Quad-Regional Radio Science and Wireless Technology Conference, Jul. 26, 2011, pp. 1204-1207.

Tau et al., "Transit Note #114: A First Generation DPGA Implementation", Jan. 1995, 9 pages.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Taylor et al., "Generalized RAD Module Interface Specification of the Field Programmable Port Extender (FPX) Version 2", Washington University, Department of Computer Science, Technical Report, Jul. 5, 2001, pp. 1-10.

Taylor et al., "Modular Design Techniques for the FPX", Field Programmable Port Extender: Jan. 2002 Gigabit Workshop Tutorial, Washington University, St. Louis, MO, Jan. 3-4, 2002.

(56) References Cited

OTHER PUBLICATIONS

Taylor et al., "Scalable Packet Classification using Distributed Crossproducting of Field Labels", Proceedings of IEEE Infocom, Mar. 2005, pp. 1-12, vol. 20, No. 1.

Taylor, "Models, Algorithms, and Architectures for Scalable Packet Classification", doctoral thesis, Department of Computer Science and Engineering, Washington University, St. Louis, MO, Aug. 2004, pp. 1-201.

Thomson Reuters, "Mellanox InfiniBand Accelerates the Exegy Ticker Plant at Major Exchanges", Jul. 22, 2008, URL: http://www.reuters.com/article/pressRelease/idUS125385+22-Jul-2008+BW20080722.

Uluski et al., "Characterizing Antivirus Workload Execution", SIGARCH Comput. Archit. News, vol. 33, No. 1, pp. 90-98, Mar. 2005.

Villasenor et al., "Configurable Computing Solutions for Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.

Waldvogel et al., "Scalable High-Speed Prefix Matching", ACM Transactions on Computer Systems, Nov. 2001, pp. 440-482, vol. 19, No. 4.

Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.

Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.

Web-Pop (Professional Options Package) (www.pmpublishing.com).

West et al., "An FPGA-Based Search Engine for Unstructured Database", Proc. of 2nd Workshop on Application Specific Processors, Dec. 2003, San Diego, CA.

Wooster et al., "HTTPDUMP Network HTTP Packet Snooper", Apr. 25, 1996.

Yamaguchi et al., "An Approach for Homology Search with Reconfigurable Hardware", Google, 2001, pp. 374-375.

Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.

Yan et al., "Enhancing Collaborative Spam Detection with Bloom Filters", 2006, IEEE, pp. 414-425.

Yoshitani et al., "Performance Evaluation of Parallel Volume Rendering Machine Re Volver/C40", Study Report of Information Processing Society, Mar. 5, 1999, pp. 79-84, vol. 99, No. 21.

Office Action for U.S. Appl. No. 14/060,339 dated Nov. 2, 2017.
Office Action for U.S. Appl. No. 14/694,580 dated Sep. 8, 2017.
Office Action for U.S. Appl. No. 14/694,595 dated Nov. 30, 2017.
Office Action for U.S. Appl. No. 15/404,794 dated Jan. 25, 2018.
Office Action for U.S. Appl. No. 15/489,065 dated Jul. 28, 2017.
Office Action for U.S. Appl. No. 15/489,065 dated Jun. 4, 2018.

\* cited by examiner

*Dynamic Field ("DynField") Schema Types*
- Type 1 (e.g., "Simple"): A single atomic octet string value
    - It may have an associated interpretation (e.g., a number format or character set)
- Type 2 (e.g., "Group"): Describes the format of compound data as an ordered sequence of named Fields, each Field having an associated Type (e.g., Type 1, Type 2, etc.)
- Type 3 (e.g., "Array"): A sequence of zero or more elements of a single Type.
    - The array may have a fixed length or a variable length
- Type 4 (e.g., "Switch"): Describes a set of variant data formats as named Cases.
    - Each Case has an associated Type (and different Cases in a Switch can have different Types than other Cases in that Switch)
    - Each Case also defines an expression which, when evaluated, determines whether that Case is the one present in the data.

Figure 2

```
MESSAGE_CLASS is group {
    HEADER is group {
        LENGTH is number;
        TYPE is number;
    }
    BODY is variable_switch {
        DATA is group {
            DATA_SIZE is number;
            DATA is byte[this.DATA_SIZE]
        } when (this.parent.HEADER.TYPE == DataMsg);
        ERROR is group {
            ERROR_CODE is number;
            ERROR_SOURCE is char[30];
            ERROR_MESSAGE is char[] terminating when (element == '\0');
        } when (this.parent.HEADER.TYPE == ErrorMsg);
    }
}
```

Figure 3A

```xml
<Define>
    <Start type="MESSAGE_CLASS"/>
    <Group name="MESSAGE_CLASS">
        <Field name="HEADER">
            <Group>
                <Field name="LENGTH">
                    <Simple length="4"/>
                </Field>
                <Field name="TYPE">
                    <Simple length="2"/>
                </Field>
            </Group>
        </Field>
        <Field name="BODY">
            <Switch uniform_length="false">
                <Case name="DATA" when="value(..;HEADER;TYPE) == 'DATA'">
                    <Group>
                        <Field name="DATA_SIZE">
                            <Simple length="4"/>
                        </Field>
                        <Field name="DATA">
                            <Array
 variable_length=";MESSAGE_CLASS;BODY;DATA;DATA_SIZE">
                                <Simple length="1"/>
                            </Array>
                        </Field>
                    </Group>
                </Case>
                <Case name="ERROR" when="value(..;HEADER;TYPE) == 'ERROR'">
                    <Group>
                        <Field name="ERROR_CODE">
                            <Simple length="4"/>
                        </Field>
                        <Field name="ERROR_SOURCE">
                            <Array fixed_length="30">
                                <Simple length="1"/>
                            </Array>
                        </Field>
                        <Field name="ERROR_MESSAGE">
                            <Array terminating_when="element=='\0'">
                                <Simple length="1"/>
                            </Array>
                        </Field>
                    </Group>
                </Case>
            </Switch>
        </Field>
    </Group>
</Define>
```

Figure 3B

```
<Define>
   <Group name="G">
      <Field name="SIZE">
         <Simple length="1" usage="ASCII Number String"/></Field>
      <Field name="ARRAY">
         <Array length="subtract(valueOf(..;SIZE), int(1))">
            <Simple length="2"/></Array></Field>
   </Group>
   <Start type="G" />
</Define>
```

Figure 11A

```
maxBufferBytes:2
{Subroutine: 0/<0x200, Define;G> stack:0 instructions:1:[
   {HandleGroup metadataValue:0x200 subroutine:1}
]}
{Subroutine: 1/<0, Define;G> stack:13:[
   {value of Define;G;SIZE: 1}
   {counter for Define;G;ARRAY: 4}
   {Subexpression result L for Define;G;ARRAY: 4}
   {Subexpression result R for Define;G;ARRAY: 4}
] instructions:3:[
   {CopyToStack source:{Input ofs:0 len:1} targetStackOffset:0}
   {CopyToOutputToken metadataValue:0x180
      value:{Input ofs:0 len:1} advanceInput:true}
   {HandleGroup metadataValue:0x80 subroutine:2}
]}
{Subroutine: 2/<0, Define;G;ARRAY> stack:0 instructions:5:[
   {ConvertNumber sourceStackOffset:0 sourceLengthBytes:1
      sourceFieldUsage:"ASCII Number String" sourceSignType:unsigned
      sourceDecimalOffset:0 sourceDecimalType:implied sourceDigits:0
      sourceLeftFill:0 targetStackOffset:5 targetLengthBytes:4
      targetFieldUsage:"Little Endian Int" targetSignType:signed
      targetDecimalOffset:0 targetDecimalType:implied targetDigits:0
      targetLeftFill:0}
   {CopyToStack source:{Const 4:"...." [01 00 00 00]} targetStackOffset:9}
   {BasicMath operator:subtract left_operand_stack_offset:5
      right_operand_stack_offset:9 target_stack_offset:1}
   {RangeCheck valueStackOffset:1 min:0 max:2147483647}
   {HandleArray sizeStackOffset:1 subroutine:3}
]}
{Subroutine: 3/<0x100, Define;G;ARRAY;element> stack:0 instructions:1:[
   {CopyToOutputToken metadataValue:0x100
      value:{Input ofs:0 len:2} advanceInput:true}
]}
totalSubroutines:4
```

Figure 11B

| Token Types | | |
|---|---|---|
| Plain (Schema-Driven) DF | XML | JSON |
| FIELD | | |
| START_GROUP | START_ELEMENT | START_OBJECT |
| END_GROUP | END_ELEMENT | END_OBJECT |
| | | START_ARRAY |
| | | END_ARRAY |
| | ATTRIBUTE_NAME | |
| | ATTRIBUTE_VALUE | |
| | | LABEL |
| | TEXT | QUOTED_VALUE |
| | CDATA | UNQUOTED_VALUE |
| | COMMENT | |
| | PI_TARGET | |
| | PI_CONTENT | |
| | DTD | |
| | UNKNOWN_ENTITY | |

Figure 15

```
STRING is group {
    LENGTH is number;
    CHARACTERS is char[this.LENGTH];
}
BAKERY_ORDER is group {
    CUSTOMER_NAME is STRING;
    ADDRESS is STRING;
    NUM_ITEMS is number;
    ITEMS is array[this.NUM_ITEMS] of {
        variable_switch {
            CUPCAKE is group {
                TYPE is char;
                CAKE_FLAVOR is STRING;
                FROSTING_COLOR is STRING;
            } when (this.TYPE == 'C');
            SHEETCAKE is group {
                TYPE is char;
                CAKE_FLAVOR is STRING;
                FROSTING_FLAVOR is STRING;
                WIDTH is number;
                HEIGHT is number;
            } when (this.TYPE == 'S');
            SUGAR_COOKIE is group {
                TYPE is char;
                COUNT is number;
            } when (this.TYPE == 'K');
        }
    }
    SUBTOTAL is number;
    TAX is number;
    TOTAL is number
}
```

Figure 16

DYNAMIC FIELD DATA TRANSLATION TO SUPPORT HIGH PERFORMANCE STREAM DATA PROCESSING

CROSS-REFERENCE AND PRIORITY CLAIM TO RELATED PATENT APPLICATION

This patent application claims priority to U.S. provisional patent application Ser. No. 62/248,117, filed Oct. 29, 2015, and entitled "Dynamic Field Data Translation to Support High Performance Stream Data Processing", the entire disclosure of which is incorporated herein by reference.

INTRODUCTION

There is a significant need in the art for high performance processing of streaming data, in particular for high performance record-oriented stream data processing. As used herein, the terms "stream processing", "stream data processing" or "streaming data processing" refer to their traditional meanings within the art; namely the processing of large quantities of data while only operating on a relatively small, sequentially advancing working window of the data. Staying within the bounds of this working window means that the rest of the stream before and after the window can be anywhere—e.g., in memory, on disk, being processed by another thread or another computer, in flight, on the wire, or not even generated yet. This is important for processing large data sets (as it limits storage required to a manageable level and allows pipelined processing) and for processing "live" data streams with no particular ending. Stream data processing can be contrasted with batch processing, where batch processing processes all the data "at once", allowing modifications anywhere in the data set at any time. Furthermore, streaming data processing is said to be "record-oriented" when the streaming data being processed is structured as a plurality of records. Each record can have specific fields and may include repeating hierarchy units. This record-oriented nature is in contrast to processing unstructured text (which has no fields) and single documents (which have few repeating units, which also implicitly limits their size).

A number of factors have limited the wide availability of high performance, low latency stream data processing. For example, the data to be processed is often in a format that is not very suitable for streaming data processing. Moreover, for many data formats that are suitable for streaming data processing, other characteristics of such data formats leave room for improvement, as discussed below.

In the simplest case, a highly efficient format for record-oriented streaming data processing is a fixed field format. In this representation, all fields in a record are of a known fixed length and at a known location within the record, and thus the whole record has a known fixed length. Any field can be accessed directly for stream processing by calculating its address within the record, and records can be quickly skipped by advancing a known fixed number of bytes. No metadata need be stored in the data. However, there are two primary disadvantages of fixed field format. The first disadvantage is that each field must be wide enough to accommodate all legal values, which can cause significant data bloat leading to increased processing time, particularly when the largest value is much larger than the common values of a field. The second disadvantage is that a data stream cannot represent hierarchical data or data with a field that repeats a variable number of times. Complex, hierarchical data refers to data where the structure of that data varies within a repeating unit or where the number of repetitions of a unit varies. FIG. 16 depicts an example of a complex, hierarchical data structure. In the example of FIG. 16, the number of elements in the ITEMS array may be different for every order, and the number characters in every STRING.CHARACTERS array may be different; thus, the number of repetitions of a unit varies. For each element in the ITEMS array, it may be a CUPCAKE with three fields, a SHEETCAKE with five fields, or a SUGAR_COOKIE with two fields. The structure of the data (whether it is a CUPCAKE, SHEETCAKE, or SUGAR_COOKIE) varies within a repeating unit (ITEMS.element). FIG. 3A, discussed further below, depicts another example of a complex, hierarchical data structure. In the example of FIG. 3A, the structure of the MESSAGE_CLASS.BODY varies within a repeating unit (the unit MESSAGE_CLASS), and the number of repetitions varies for MESSAGE_CLASS.BODY.DATA.DATA and for MESSAGE_CLASS.ERROR.ERROR_MESSAGE.

Simple delimited data formats such as CSV (comma separated value) include metadata in the stream to identify field and record boundaries, which allows variable length fields and solves the problem of data bloat, but at the cost of an expensive, state machine-driven byte-by-byte crawl to locate fields and process the data. Simple delimited formats also do not solve the problem of representing complex, hierarchical data.

More complicated formats exist for representing complex data, however, they are not optimized for streaming data processing. ASN.1 BER (Abstract Syntax Notation One Basic Encoding Rules) is a format that represents data in a very flexible and memory-efficient way, but locating a field can require an even more expensive bit-by-bit crawl. JSON (JavaScript Object Notation) can represent complex hierarchy but stores data in a textual representation, producing data bloat, and requires a byte-by-byte crawl to locate the delimited fields. XML (Extensible Markup Language) is similar to JSON but with even harder to parse delimiters. IFF (Interchange File Format)-style TLV (type-length-value) format can represent complex data and be crawled quickly to locate fields, but is not suited to streaming processing because modifying the length of a chunk (i.e., a field) requires updating the lengths in the headers of all the containing chunks. In a streaming data processing system, those headers will likely have already passed to the next processing element and no longer be available to update. COBOL supports a "fixed field" data format that supports complex data, however there is no metadata in the data stream. Locating a field requires maintaining a state machine that includes business logic that is only described by a COBOL program.

In an effort to overcome these shortcomings in the art, the inventors disclose a new format for representing data—a dynamic field (DynField) format, and the inventors further disclose an application of this dynamic field format using computer technology to support high performance, low latency streaming data processing. The "dynamic" in the dynamic field format refers to the fact that the format is flexible at execution time (e.g., the structure of the data can vary within a repeating unit or that the number of repetitions of a unit can vary, and fields can be variable size) and self-describing (e.g., field boundaries and hierarchical structure for the data can be determined solely by looking at the data stream). This stands in contrast to formats such as a variable format (where field size may vary but the structure remains the same) or a fixed format (where only one size is allowed for each field).

Accordingly, the dynamic field format is optimized for record oriented streaming data processing on complex data. The dynamic field format is an ordered collection of fields that supports variable length fields and complex, nested data structures. For example, one field might describe whether the following field is of Type A or Type B. Data in the dynamic field format can be processed without backtracking to modify previously processed data. Each field can be distinguished individually; no state-tracking is necessary to identify and edit a single field. Furthermore, the amount of buffering needed for processing is bounded and deterministic.

Thus, when a data stream is formatted in accordance with the dynamic field format as a stream of tokens where each token includes metadata that describes the dynamic field format, a downstream processing element can identify a field of data to work on based upon any identifier stored in the metadata for the data stream (e.g., token metadata such as a token type, field identifier, user tags, etc.) in a unified manner without having a detailed understanding of the metadata layout. For example, through a simple bitwise mask and compare operation, the downstream processing element can identify and locate a field of interest in the token stream. Thus, while a binary data format such as a copybook can identify a field primarily by field identifier and while a self-describing delimited format such as XML can identify a field primarily by token type or region of interest identifier, data in these two formats cannot be processed uniformly by a processing element. However, if data in these two formats were converted to the dynamic field format, the same downstream processing element (such as an encryption engine or regular expression matcher) can treat these originally quite different formats uniformly by operating on a token that matches a given mask and value.

In an example embodiment, the particular data structure being represented is first described declaratively using a dynamic field schema. This dynamic field schema is then applied to a rules-based compiler that operates to generate a program for use by an interpreter to parse an incoming data stream and generate an outgoing data stream in the DynField format.

These and other features and advantages of the present invention will be described hereinafter to those having ordinary skill in the art.

BRIEF DESCRIPTION OF THE DRAWINGS

FIG. 2 depicts a list of DynField scheme types for an example embodiment.

FIGS. 3A and 3B depict example representations of a DynField schema for data in a message class.

FIGS. 11A and 11B respectively depict examples of an input schema for use to generate a compiled translation program and the compiled program generated by the compiler from the input schema.

FIG. 15 depicts token types that can be used for plain DF, XML, and JSON.

FIG. 16 depicts an example of a complex, hierarchical data structure.

DETAILED DESCRIPTION OF EXAMPLE EMBODIMENTS

Figure 1A:
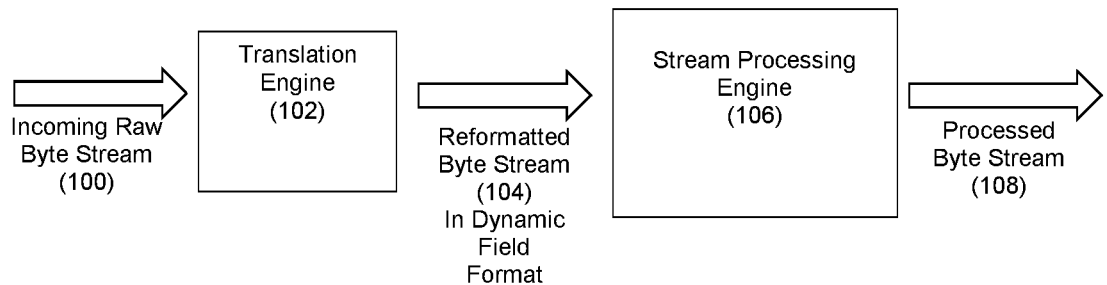
FIG. 1A depicts an example system in accordance with an example embodiment.

FIG. 1A shows an example system that includes a translation engine 102 feeding a downstream stream processing engine 106. The translation engine 102 ingests a raw data stream 100 and generates an outgoing reformatted data stream 104 that is in the DynField format. The stream processing engine 106 is then able to perform high performance stream data processing on stream 104, including selectively targeting desired fields of stream 104 for processing if desired, to generate a processed data stream 108. Additional details about technology that can serve as the stream data processing engine 106 are provided below and further described in U.S. patent application Ser. No. 14/694,580, filed Apr. 23, 2015, published as U.S. Patent Application Publication 2015/0310077, the entire disclosure of which is incorporated herein by reference (see, for example, data processing stages 300 and 2900 described in the '580 patent application with reference to FIGS. 4, 5, 29, 30, 35, 37, and 38 of the '580 patent application).

The translation engine 102 can be deployed on a processor, and the processor can take the form of any of a number of platforms. For example, the translation engine 102 can take the form of a processor that executes software. As another example, the translation engine 102 can take the form a reconfigurable logic device (e.g., a field programmable gate array (FPGA)) with hardware logic deployed thereon for the translation operations. As additional example, the translation engine 102 can take the form of a graphics processing unit (GPU) or chip multi-processor (CMP). Further still, the translation engine 102 can include a combination of such platforms (e.g., the translation engine 102 may be partly deployed in software executed by a processor and partly deployed in hardware logic on an FPGA). As used herein, the term "reconfigurable logic" refers to any logic technology whose form and function can be significantly altered (i.e., reconfigured) in the field post-manufacture. This is to be contrasted with a general purpose processor (GPP), whose function can change post-manufacture, but whose form is fixed at manufacture. An example of a reconfigurable logic device is a programmable logic device (PLD), such as a field programmable gate array (FPGA). As used herein, the term "general-purpose processor" (or "GPP") refers to a hardware device having a fixed form and whose functionality is variable, wherein this variable functionality is defined by fetching instructions and executing those instructions, of which a conventional central processing unit (CPU) is a common example. Exemplary embodiments of GPPs include an Intel Xeon processor and an AMD Opteron processor. Furthermore, as used herein, the term "software" refers to data processing functionality that is deployed on a GPP or other processing devices, wherein software cannot be used to change or define the form of the device on which it is loaded. By contrast, the term "firmware", as used herein, refers to data processing functionality that is deployed on reconfigurable logic or other processing devices, wherein firmware may be used to change or define the form of the device on which it is loaded. The above-referenced and incorporated '580 patent application describes examples of suitable reconfigurable logic-based platforms that include data processing operations deployed as pipelines in firmware on reconfigurable logic to accelerate data processing tasks. Such a platform may also be used for example embodiments of the translation engine 102 and/or stream data processing engine 106.

Figure 1B:
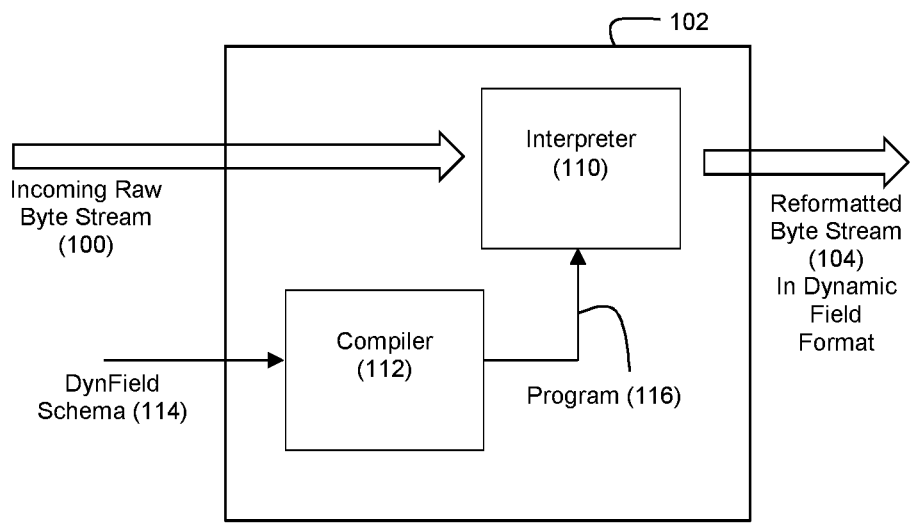
FIG. 1B depicts an example translation engine in accordance with an example embodiment.

FIG. 1B depicts an example translation engine 102 that includes an interpreter 110 and a compiler 112. Interpreter 110 decomposes, parses, and interprets the incoming raw data stream 110 to generate the outgoing data stream 104 in the DynField format. The compiler 112 processes a user-defined dynamic field schema 114 that converts the rules and representations of the schema 114 into a program 116 that defines how the interpreter 110 will perform its decomposition, parsing, and formatting tasks. The instructions of program 116 are largely oriented to the decomposition task, namely copying source fields to output tokens, doing bookkeeping appropriate for groups and arrays, and some general string and Boolean operations for deciding which choice to make when the next element in the data structure is conditional.

Dynamic Field Schemas:

The Dynamic Field Schema 114 is a data description language for a DynField representation of a record structure. Typically, DynField data descriptions will be created in memory directly from COBOL copybooks. However, this need not be the case. Moreover, an exception is specifying REDEFINE rules for copybooks. In COBOL, a REDEFINE indicates that a chunk of data may be interpreted in more than one way and the user must decide which interpretation is intended. These business rules are not present in the copybook, so the workflow configuration specifies them using a subset of, for example, a DynField Schema XML representation. Other uses for which the Dynamic Field Schema 114 might be useful include:

Describing data that is treated as a BLOB in a copybook
Describing headers or other record data that are sent along with data (VSAM headers, etc.)
Describing XML data
Describing JSON data
Describing CSV data
Describing type-length-value (TLV) data
Describing C structs
Describing custom data structures with no copybook.

The schema 114 describes a data structure as a collection of user-defined types, which can take the form of a nested set of types that define the format of the data. FIG. 2 shows a list of types that can be used in an example DynField schema 114:

A first type may be a simple, a single atomic octet-string value, possibly with an associated interpretation (i.e., number format or character set). The Simple type is the lowest level type that can be present in a field, and Simple Types may be used to build up more complex types. Thus, the Simple type describes the format of primitive, basic, atomic, or elementary data.

A second type may be a group, which is a sequence of named fields, each with their associated type. The Group type describes the format of compound data as an ordered sequence of named fields, each field having an associated type. The order is fixed, and the names of the fields are given.

A third type may be an array, which is a sequence of zero or more elements of a single type. The array type also describes compound data, but as noted the collection of data is for a single type. The array may have a fixed length or a variable length. When the array is variable length, its length might be indicated by some other field, or it might be marked with a sentinel element at the end (e.g., a null character such as \0 might serve as a terminating sentinel).

Lastly, a fourth type may be a switch, which describes a set of variant data formats as named cases. Each case has an associated type (and different cases in a Switch type might have different types than other cases in that Switch type). Furthermore, each case also defines an expression which, when evaluated, determines whether that case is the one present in the data.

The schema also has a start member which identifies which type in the schema represents a record. A unique numeric field id is assigned to every simple and group field, array element, switch case, and start member in the schema. This field id assignment can be performed by the compiler 112 if it is not already performed by the controlling application.

Furthermore, Field References are used to represent dependencies between data fields, such as a variable length Array referring to the field which determines its length. A Field Reference specifies how to get from one type to another type or member by traversing the schema. A field reference behaves just like a relative file name in a conventional file system.

Dynamic Field Schemas—Which Way is Up?:

The following example rules and guidelines describe how DynField schemas can be traversed.

"Up" is toward the parent node(s) of the directed graph rooted at the Start Member.
You cannot go "up" from the Start Member.
"Up" is ambiguous when there are two or more fields that refer to a given type.
When a type is unreachable from the Start Member, no field references are evaluated so "up" should be irrelevant. However, the following rules apply:
For an inline type, "up" is toward the containing type.
For a top level type, there is no "up".
If a type is multiply reachable from the directed graph multiply rooted at the unreachable top level types, "up" is ambiguous. However, if a type is reachable from the Start Member graph, reachability from the "unreachable" graph is disregarded, which can make a potentially ambiguous "up" into an unambiguous "up".
The name of a type has no effect on "up". Specifically, giving an inline type a name as if it were a top level type does not make it a top level type.

A "top level type" is a type defined at the top level of a given namespace.

"Top level" is relative to specific namespace.

Nesting of namespaces does not affect whether a type is top level.

A type's name does not affect whether it is a top level type.

The inline type for a <Start> element is considered a top level type.

Every type has a "local root type" (aka relative root), and a "depth below local root" or distance from that local root.

The local root type is the outermost containing type for an inline type.

The distance to the local root is the number of "up" steps to reach the local root. It is the nesting depth of an inlined type.

A top level type is a local root. Its distance to the local root is zero.

Note: Taking "the distance from the local root" steps "up" from a type will put you at its local root type, unless the one of the parent types has been used elsewhere (by name) creating an "up" ambiguity, in which case the attempt to move "up" to the local root type will fail.

A "namespace" is a special "virtual type" which acts like a Group with members for each of its contained namespaces and top level types. It is not a type in that it can't be "instantiated" and will never be seen in the data stream, but it is convenient to treat it like a type for certain operations such as resolving field references.

Representations of Dynamic Field Schemas

DynField schemas can be represented in any of a number of forms. For example, FIG. 3A shows an example representation of a DynField schema that includes groups, arrays, and switches.

As shown by FIG. 3A, the group type MESSAGE_CLASS is the top level, which represents the entire record. The record contains two fields, called HEADER and BODY.

Similarly, HEADER is also a group type that contains two fields. In this case, the two fields are both simple types: LENGTH is a number and TYPE is also a number.

The type BODY is an example of a switch type. The two cases (i.e., the two types that the BODY can contain) are DATA or ERROR. Note that an individual instance of a BODY will only contain one of the cases, DATA or ERROR, not both.

The type DATA is a group which contains one simple type, DATA_SIZE, of type number, and one array type, DATA, of the simple type byte. The length of the DATA array is determined by the DATA_SIZE field. Thus, the schema includes a Field Reference to the DATA_SIZE field in the array specification.

The type ERROR is a group which contains three fields: ERROR_CODE, ERROR_SOURCE, and ERROR_MESSAGE.

The type ERROR_CODE is a number simple type.

The type ERROR_SOURCE is a fixed length array type of char, which is of length 30.

The type ERROR_MESSAGE is a variable length array of char that terminates when it encounters the NULL character, or '\0'.

According to the switch, an individual BODY consists of a type DATA if the HEADER.TYPE is equal to the constant value 'DataType' or consists of a type ERROR if the HEADER.TYPE is equal to the constant value 'ErrorType'.

XML is an example of a form that can be used for representing DynField schemas. For example, XML representations of DynField schemas can be useful for debugging and testing as well as defining record structures for test data generation. With respect to an example XML representation, and in elaboration of discussions above regarding schema types:

<Simple> elements represent primitive data.

<Group> elements represent compound data types.
  <Group> contains one or more child Field elements.
    <Field> has a name attribute and a either type attribute naming the type or an inline type as the child element. Separating the Field from the type gives us the flexibility to reuse types in the future.

The <Switch> element represents a set of types that could represent the format of some data. Which type is actually present must be determined at runtime by evaluating a series of condition predicates <Switch> has two or more child <Case> elements, each of which contains (or references via type attribute) a type element, and a when attribute which defines the conditions under which that type is used. Conditions are defined as an expression string, and use Field References to refer to any fields that are part of expression.

The <Array> element represents an array of a given type. It may have fixed or variable size (which may have a terminating sentinel element). Fixed-size arrays have a length attribute with a constant numeric value; variable-size arrays have a length attribute with an expression string, and Field References to refer to any fields that are part of the expression. Array elements have a (or refer to via the type attribute) child type element defining the element type of the array.

<Start> has a name attribute and declares the top-level type in the record in its type attribute.

FIG. 3B shows an example XML representation of the DynField schema shown in FIG. 3A.

Figure 4:
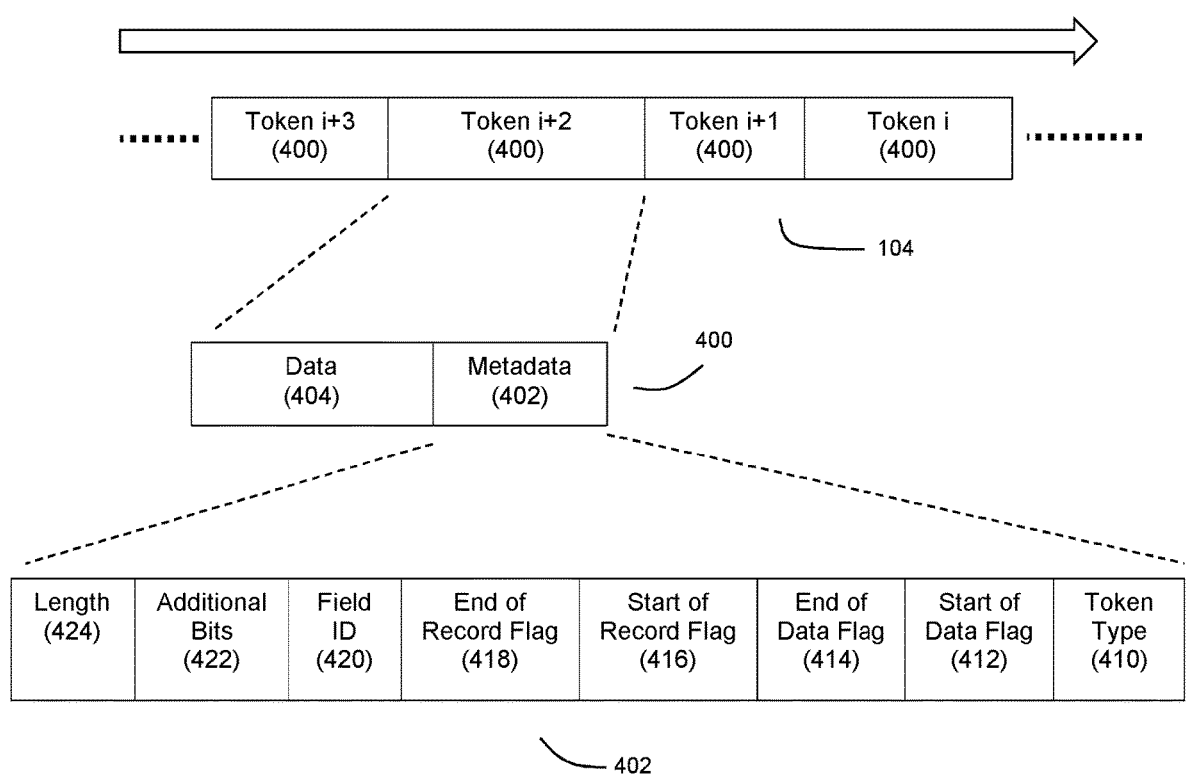
FIG. 4 depicts an example output stream of tokens for an example embodiment.

Dynamic Field Tokens:

The interpreter 110 is configured to generate the output stream 104 as a sequence of tokens 400 that describe the data according to the DynField schema 114 (see FIG. 4). As shown by FIG. 4, the tokens 400 are small data messages, where each token 400 comprises a metadata portion 402 and a data portion 404. The metadata portion 402 may be a native integer with bit-mapped fields, an example of which is shown by FIG. 4. The data portion 404 specifies the payload data. Data portion 404 may be a value that serves as a variable length octet string payload.

The metadata portion 402 holds the token type 410, the start_data and end_data flags 412 and 414, the start_record and end_record flags 416 and 418, and the field identifier 420. Additional bits 422 of the metadata may be made available to the application for marking fields of interest. Also, the metadata portion 402 may include a length field 424 (a native integer) that specifies the length of the data portion 404. As mentioned, the length of the data portion 404 may be variable from token to token.

For an example embodiment, there are three available token types 410: field, start_group, and end_group. A field token holds the value for a single field from the source data stream. Since each token 400 has a length, variable length fields can be represented and the value can be any byte sequence with no escaping required. The maximum size of a single token 400 can be determined by the number of bits used to represent the length 424. However, it should be understood that large data may be split across any number of tokens, so there need not be a constraint on the size of the underlying data. Because it can be difficult to process extremely large fields in a streaming environment, a field can be broken up across multiple sequential tokens 400. The first token 400 of a field has the start_data flag 412 set. The last token 400 of a field has the end_data flag 414 set. Small fields that fit in a single token 400 will have both flags 412 and 414 set on the token 400. The field id 420 of the token 400 will be set to the unique field id from the schema. Each container in the data stream (e.g., a group, array, or switch) is represented by a start_group token and an end_group token that surround the contents of the container. The value (data portion 404) of a start_group and end_group token 400 will always be empty. The field id 420 of both tokens 400 will be set to the unique field id from the schema. The start_record and end_record flags 416 and 418 are set on the start_group and end_group tokens 400 that mark the beginning and ending of a record. It should be understood that the start_record and end_record flags 416 and 418 can both be set on a single field token 400 in the rare case that the record consists of only one simple value.

The metadata portions 402 of the tokens 400 thus serve to describe the dynamic field nature of the raw data stream 100 in accordance with a specified dynamic field schema 114. In this fashion, metadata portions 402 serve as similar role as the structured module chain interface (SMCI) control data that describes corresponding data characters in a data stream, where SMCI control data is described in the above-referenced and incorporated '580 patent application. For example, the '580 patent application describes how the SMCI control data can include start of field (SOF) data, end of field (EOF) data, start of record (SOR) data, end of record (EOR) data, field identifier data, and count data, where the count data is indicative of how many bytes should be consumed (e.g., how many bytes are valid in a transaction (transmission of a data word)). As such, the data processing stage of downstream stream processing applications can leverage the metadata portions 402 of the output stream 104 to target fields of interest within the streaming data for selective processing similar to how the SMCI control data is used according to the '580 patent application. Thus, byte-by-byte crawls through the streaming data can be avoided to target selected fields for processing. Instead, fields of interest can be targeted based on the metadata (such as the Field IDs 420) of the token stream.

Converting a Data Stream to a Dynamic Field Format:

It is expected that the raw data stream 100 to be translated will already be encoded in a transport format, such as CSV records or copybook-defined multi-layout "fixed field" records. To get the processing efficiency of the dynamic field format, the source data stream 100 will need to be converted to dynamic field at the beginning of the processing pipeline.

Figure 5:
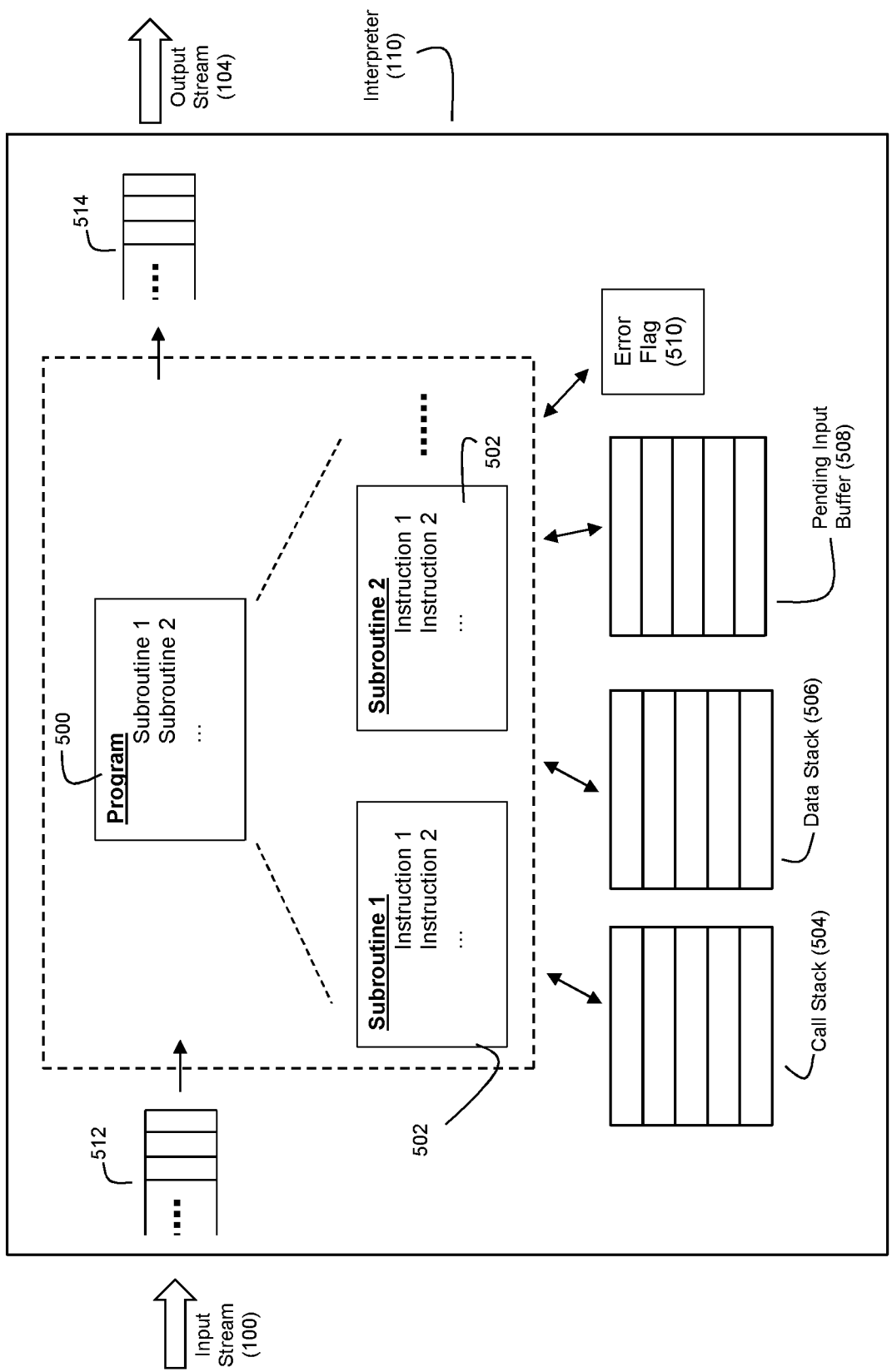
FIG. 5 depicts an example run-time environment for an interpreter in accordance with an example embodiment.

To convert a raw data stream 100 into a dynamic field format data stream 104, the raw data stream is parsed into individual fields and hierarchy markers. To implement a parser that can handle a wide variety of input formats as quickly as possible, a compact interpreter 110 for a domain specific language is used. FIG. 5 depicts an example runtime environment for interpreter 110. The run-time environment may include a program 500 (which can be an array of subroutines 502, each subroutine 502 comprising a set of instructions), a call stack 504, a data stack 506, a pending input buffer 508, and an error flag 510. Ingress and egress buffers 512 and 514 may be employed to buffer incoming data within stream 100 and outgoing tokens 400 within stream 104. Example embodiments for a software-based interpreter 110 and a hardware-based interpreter are discussed below. The software interpreter has more resources available (e.g., can have greater stack depths and store larger programs) for handling extreme data formats, but the hardware implementation is faster and handles the majority of data formats seen in practice.

The compiler 112 converts the schema 114 describing the source data stream 100 into a program 500 describing the steps the interpreter 110 must execute to convert the data stream 100. Example steps are creating a token 400 from input data, counting out the right number of elements of an array as they are produced, and making decisions about which case of a switch is represented in the source data.

The schema 114 describing source data stream 100 is read from one or more external files. An XML file describing all the type objects can be used to specify the schema 114 (as discussed above). The system can also read a text file in COBOL copybook format and generate the corresponding schema 114 it describes using a mapping: data names map to fields, nested levels map to groups, OCCURS and OCCURS DEPENDING ON map to arrays, and REDEFINES map to switches. Because the COBOL copybook format does not contain the rules that define which case of a REDEFINE should be chosen, we use, as an example embodiment, an XML file containing both a link to the copybook file and a description of the redefine rules.

Figure 6:
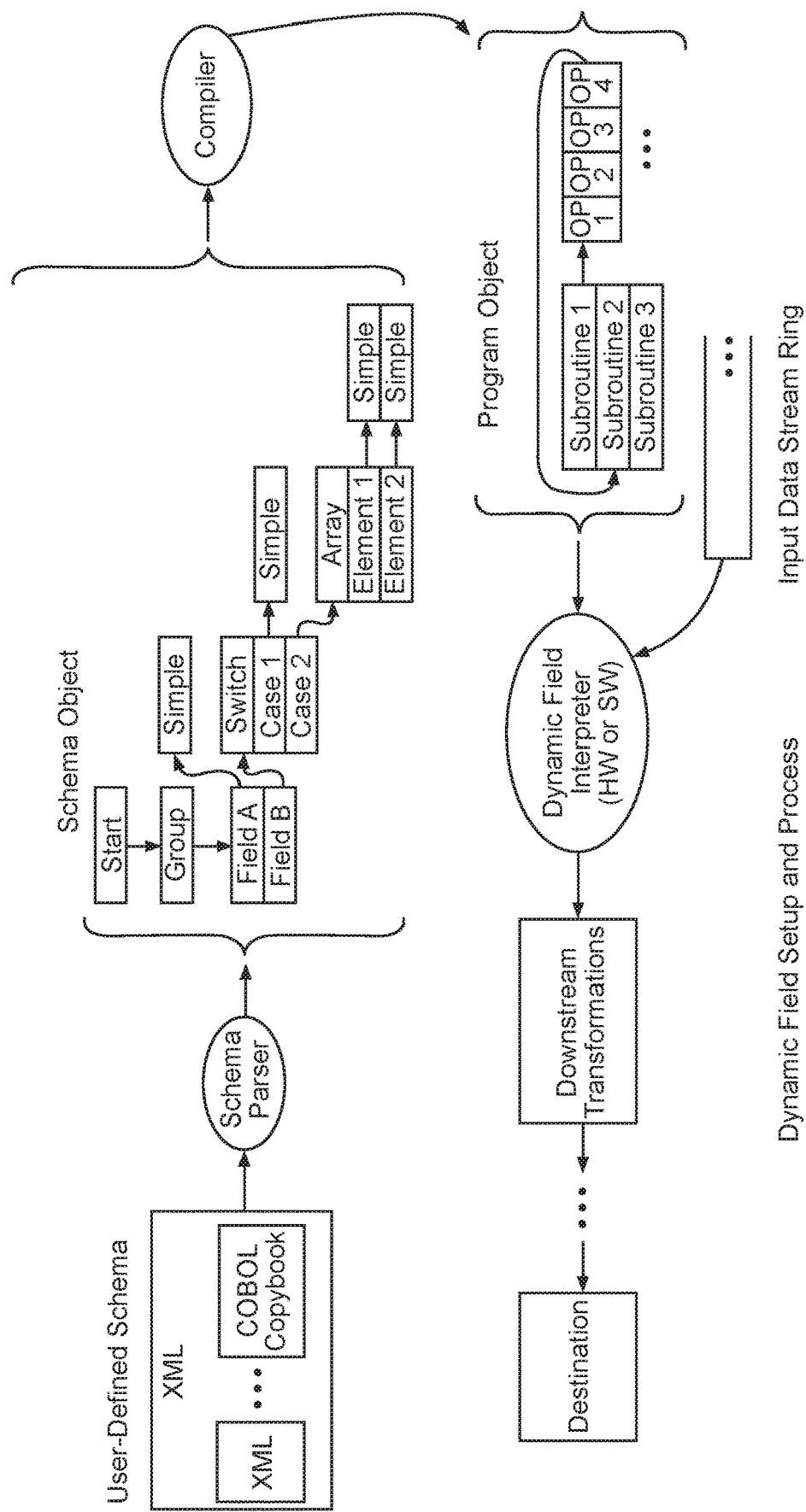
FIG. 6 depicts an overview of the process for converting a source data stream into an output stream in the DynField format.

Thus, to convert a raw data stream 100, first the user-defined schema 114 stored in one or more files is read into an in-memory schema object. Next the compiler 112 processes the schema 114 and generates a program 500 comprising subroutines 502 and instructions that describe the actions needed to convert the source data stream 100 into dynamic field tokens 400. The interpreter 110 takes the program 500 and executes it, processing an input stream 100 in the source data format and producing a corresponding output stream 104 in dynamic field format. An overview of this process is shown by FIG. 6.

Figure 7:
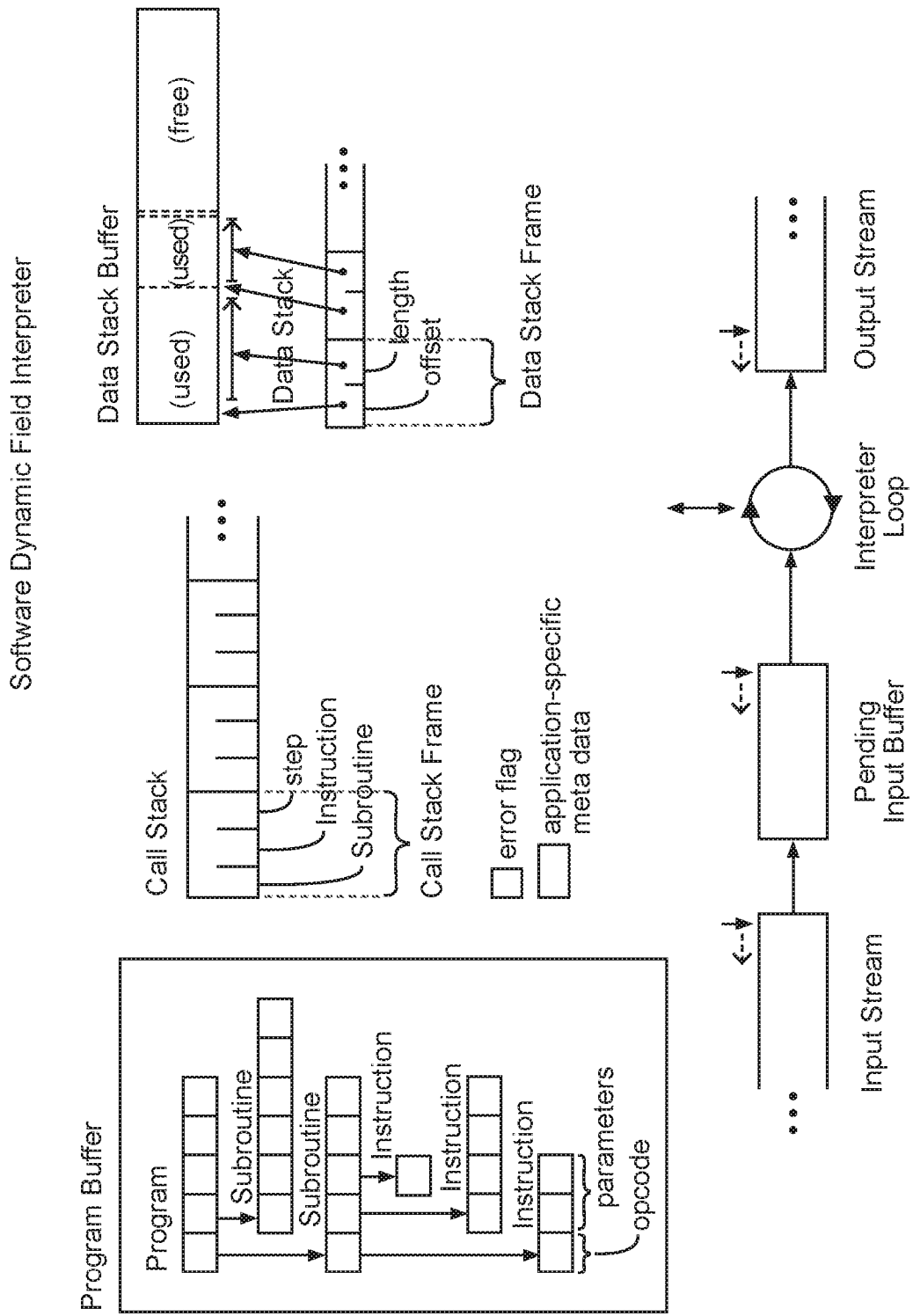
FIG. 7 depicts an example embodiment for a software-based DynField interpreter.

Software-Based Dynamic Field Interpreter 110:

FIG. 7 discloses a detailed runtime environment model for interpreter 110, as exemplified by an example software implementation. The interpreter's runtime environment comprises a program buffer, a call stack, a data stack, a data stack buffer, a pending input buffer, an error flag, an application-specific metadata value, an input stream, and an output stream. This composes the entire context of the interpreter while processing a single input stream. The interpreter can pause processing or switch to processing a different input stream so long as all of this context is saved and restored.

The call stack is an array of call stack frames and an associated top-of-stack index. A call stack frame stores the interpreter's location within a program so that it can resume execution at that point. A call stack frame comprises a subroutine index, an instruction index, and a step index. The size of the call stack is fixed. If during execution the stack overflows, processing the input stream fails: the interpreter enters the error state and remains in that state discarding input until flushed.

The data stack buffer is the memory used to store intermediate values needed while parsing the input stream. The size of the buffer is fixed. The data stack is an array of data stack frames and an associated top-of-stack index. A data stack frame identifies the region of the data stack buffer holding intermediate values for the current level of recursion. A data stack frame comprises an offset into the data stack buffer and a length. The size of the data stack is fixed. The data stack buffer is allocated in sequential chunks, with the data stack frames tracking the offset and size of these chunks. The next free byte in the data stack buffer is identified by the offset in the top stack frame plus the length in the top stack frame. If during execution the stack overflows or there is insufficient free space in the buffer, processing the input stream fails: the interpreter enters the error state and remains in that state discarding input until flushed.

The pending input buffer stores bytes that need to be temporarily skipped over while doing a look-ahead operation. This allows the interpreter perform look-aheads while remaining decoupled from the buffer management of the external input stream. The size of the pending input buffer is fixed.

The error flag indicates that the interpreter has encountered a parsing error. Once set, the interpreter will produce no further output and will ignore incoming data until it is flushed.

The application-specific metadata value is the value to set for the application-specific bits in the metadata of the outgoing dynamic field tokens. The actual value will depend on the particular workflow being run and will only be utilized by downstream processing in the workflow, not the interpreter. This value does not affect the system metadata bits such as start_data or the field id.

The program buffer holds the program to be interpreted in an easily traversed binary form. The size of the program buffer is fixed.

A program comprises an array of subroutines, which can be quickly accessed by index. A program also indicates the maximum amount of buffering it will ever need when looking forward in the input stream.

A subroutine comprises an array of instructions, which can be quickly accessed by index. A subroutine also indicates the number of data stack bytes it needs allocated upon entry (the data stack frame size). This value may be zero, in which case this subroutine shares the data stack frame of the caller.

An instruction comprises an opcode and a number of parameters that depends upon the opcode. There are twelve opcodes. Many opcodes involve copying data. Data can come from the input stream, from a constant included with the instruction, or from the data stack.

Behavior of the Interpreter:

The interpreter is configured by loading a program into the program buffer. If the program is larger than the program buffer, or if the program requires a more buffering than the size of the pending input buffer, configuration fails. The application-specific metadata value is set appropriately (or cleared).

The call stack and the data stack are initially empty, and the error flag is clear.

Interpreting begins when input is seen on the input stream. If the call stack is empty when there is data on the input stream, a new stack frame with {subroutine 0, instruction 0, step 0} is pushed onto the call stack. A new data stack frame is pushed onto the data stack pointing to a block of the data stack buffer of the size specified in subroutine 0. (This may be zero bytes.)

At each interpreting step, the instruction step indicated by the top call stack frame is executed. In general, the processing for each instruction is lengthy enough that it is necessary to be able to switch contexts or invoke a subroutine in the middle of an instruction. The step index indicates where within the instruction the interpreter is working.

When instructions reference bytes on the data stack, the offset is always relative to the location in the data stack buffer pointed at by the top data stack frame.

When instructions reference bytes in the input stream, the bytes in the pending input buffer (if any) are considered to precede the bytes currently accessible in the input stream. Thus, byte offsets into the input stream first count through the pending input buffer and then into the input stream. If an instruction needs to access a byte deeper in the input stream than is currently available, all the available bytes in the input stream are copied and appended to the pending input buffer. The bytes in the input stream are marked as consumed and the interpreter pauses until more bytes are available on the input stream.

When an instruction makes a subroutine call, it pushes a new call stack frame on the stack with the new subroutine index, instruction 0, and step 0. If the subroutine has a non-zero data stack size, a new data stack frame of the specified size is pushed onto the data stack.

When an instruction is completed, the instruction index is incremented and the step index is set back to zero. If the instruction index exceeds the number of instructions in the current subroutine, the interpreter returns to the calling subroutine: first, if the terminating subroutine has a non-zero data stack size, the current data stack frame is popped. Next, the current call stack frame is popped. If the call stack is non-empty, interpretation resumes at the location specified by the top call stack frame. If the call stack is empty, a single record has been successfully processed. If the input stream is non-empty, the stacks are reinitialized as described above and processing begins on the next record. Otherwise, the end of the input has been reached and interpretation stops.

When the end of the input stream is reached, the interpreter proceeds to flush its state. The current instruction is given the opportunity to finish processing in case it has special behavior at the end of the input stream (for example, see "copy until delimiter" below). Once no further processing can be done, if the error flag is not set and the call stack is not empty, then the interpreter reports the error that there was a flush in the middle of a record and sets the error flag. Once any pending error has been reported, the call stack, the data stack, the pending input buffer, and the error flag are all cleared and the interpreter is ready to process the next input stream.

Program Instructions:

The "advance input" instruction discards data from the head of the input stream. The instruction has one parameter, which is a constant number of bytes to discard. When the step index is zero at the beginning of processing, the number of bytes to discard is loaded into the step index. Bytes are discarded first from the pending input buffer and then from the input stream, decrementing the step index on each byte. When decrementing the step index causes it to reach zero, the instruction completes.

The "copy to stack" instruction copies data from the given source to the given location on the data stack. The first parameter to the instruction is the source (input, constant, or stack; offset; length). The second parameter is the target data stack offset. First, if the source is the input stream and the number of bytes available in the pending input buffer plus the number of bytes available in the input stream is less than the length to copy, the available bytes are copied to the pending input buffer and the interpreter pauses until there is more input available. Next, the specified number of bytes are copied from the source to the specified stack location and the instruction completes. This instruction has only one step.

The "copy to output token" instruction copies data from the given source to a new token on the output stream. The first parameter is the field id to use for the output token. The second parameter is the source for the value (input, constant, or stack; offset; length). The third parameter is a flag indicating whether to immediately advance the input stream by the size of the source value. First, if the source is the input stream, the interpreter buffers to the pending input buffer until the specified number of bytes is available (as previously described in "copy to stack"). Second, the interpreter pauses until the output stream is able to accept a token with a value of the specified size. The interpreter writes a field token to the output stream, with the start_data and end_data flags set, the field id from the instruction, the application-specific metadata from the context, the start_record and end_record flags set if the call stack depth is one, and the value copied from the specified source. Last, if the advance input flag is set, discard bytes from the pending input buffer and then from the input stream until the number of value bytes written have been discarded. This completes the instruction. This instruction only has one step.

The "copy until delimiter" instruction copies data from the input stream to new token(s) on the output stream until one of the specified delimiters is seen. The first two parameters are the minimum length and maximum length of the field. The third parameter is the maximum number of bytes to write into a single token before writing the remainder into an additional token. The fourth parameter is the field id to use for the output token(s). The fifth parameter is a table of 256 booleans indicating for each possible input byte whether it is considered a delimiter. The interpreter looks forward in the input stream until it finds a byte that is listed in the table as a delimiter, until the end of the input stream is reached, or until it has looked ahead the maximum token size. If a delimiter or end of stream is reached, the length of the field is checked against the minimum and maximum field lengths and the interpreter reports and error and enters the error state if the field size is out of bounds. The interpreter then pauses until the output stream can accept a token with a size of the number of bytes read so far. The interpreter then creates a field token with the specified field id, the correct start_data and end_data flags, the correct start_record and end_record flags, and the application-specific metadata. If a delimiter has not been found, the instruction keeps looking ahead in the input stream. Otherwise, the instruction completes. This instruction only has one step.

The "copy counted" instruction copies a number of bytes specified by a number on the stack from the input stream to new token(s) on the output stream. The first parameter is the data stack offset to the number of bytes to count. The second parameter is the maximum number of bytes to write into a single token before writing the remainder into an additional token. The third parameter is the field id to use for the output token(s). The interpreter looks forward in the input stream until the number of bytes specified on the stack has been found, or until it has looked ahead the maximum token size. The interpreter then pauses until the output stream can accept a token with a size of the number of bytes read so far. The interpreter then creates a field token with the specified field id, the correct start_data and end_data flags, the correct start_record and end_record flags, and the application-specific metadata. The number on the stack is decremented by the number of bytes read. If the number on the stack is non-zero, the instruction keeps looking ahead in the input stream. Otherwise, the instruction completes. This instruction only has one step.

The "handle group" instruction writes a group_start token, calls a subroutine to write the group content, and writes a group_end token. The first parameter is the field id to use for the output token. The second parameter is the index of the subroutine to call. For the first step of the instruction, the interpreter pauses until the output stream can accept a token with an empty value. The interpreter writes a group_start token with the specified field id, the start_data and end_data flags both set, the correct start_record flag, and the application-specific metadata. The interpreter increments the step number on the call stack and calls the specified subroutine. For the second step of the instruction, the interpreter pauses until the output stream can accept a token with an empty value. The interpreter writes a group_end token with the specified field id, the start_data and end_data flags both set, the correct end_record flag, and the application-specific metadata. This completes the instruction. This instruction thus has two steps.

The "handle array" instruction calls a subroutine the number of times specified by a number on the stack. The first parameter is the data stack offset to the number of times to call the subroutine. The second parameter is the index of the subroutine to call. The interpreter looks at the number in the specified location on the stack. If the number is non-zero, the interpreter decrements the number and calls the specified subroutine. Otherwise, if the number is zero, the instruction completes. This instruction has only one step.

The "handle switch" instruction looks up a key from the stack in a hash map and calls the selected subroutine, or calls a default subroutine if the key is not in the map. The first parameter is the number of bytes in the key. The second parameter is the data stack offset to the key. The third parameter is the subroutine index of the default subroutine. The fourth parameter is the number of hash table entries in the hash table. The fifth parameter is an array of hash table entries. Each hash table entry contains a key and its associated subroutine index. In the first step, the interpreter first increments the step number on the call stack. Next, the interpreter hashes the key located on the stack and finds the corresponding entry in the hash table. If the key is found in the hash table, the interpreter calls the corresponding subroutine. If the key is not found in the hash table, the interpreter calls the default subroutine. In the second step, the instruction completes. This instruction thus has two steps.

The "convert number" instruction performs a number-format conversion of a number located on the stack. The first parameter is the data stack offset to the source number. The second parameter is the length of the source number. The third parameter is the number format of the source number. The fourth parameter is the data stack offset to the target number. The fifth parameter is the length of the target number. The sixth parameter is the number format of the target number. The interpreter performs a numeric conversion on the source number, writing the result to the target number, completing the instruction. This instruction has only one step.

The "range check" instruction checks whether a number on the stack is within specified range. The first parameter is the data stack offset to the number. The second parameter is the minimum allowed value. The third parameter is the maximum allowed value. The interpreter first compares the number on the stack against the minimum. If the number is less than the minimum, the interpreter reports the error, sets the error flag, and the instruction completes. Next the interpreter compares the number on the stack against the maximum. If the number is greater than the maximum, the interpreter reports the error, sets the error flag, and the instruction completes. If no error occurs, the number is in range and the instruction completes. This instruction has only one step.

The "basic math" instruction adds, subtracts, multiplies, divides, or mods two numbers on the stack. The first parameter is the operator to use (add, subtract, multiply, modulo). The second parameter is the data stack offset to the left operand. The third parameter is the data stack offset to the right operand. The fourth parameter is the data stack offset to the result. The interpreter performs the specified operation on the specified numbers from the stack and writes the result to the specified number on the stack. If an overflow, underflow, or division by zero occurs, the interpreter reports the error, sets the error flag. This completes the instruction. This instruction has only one step.

The "error" instruction reports an error. The first parameter is the error to report. The interpreter reports the error and sets the error flag. This completes the instruction. This instruction has only one step.

Figure 8:
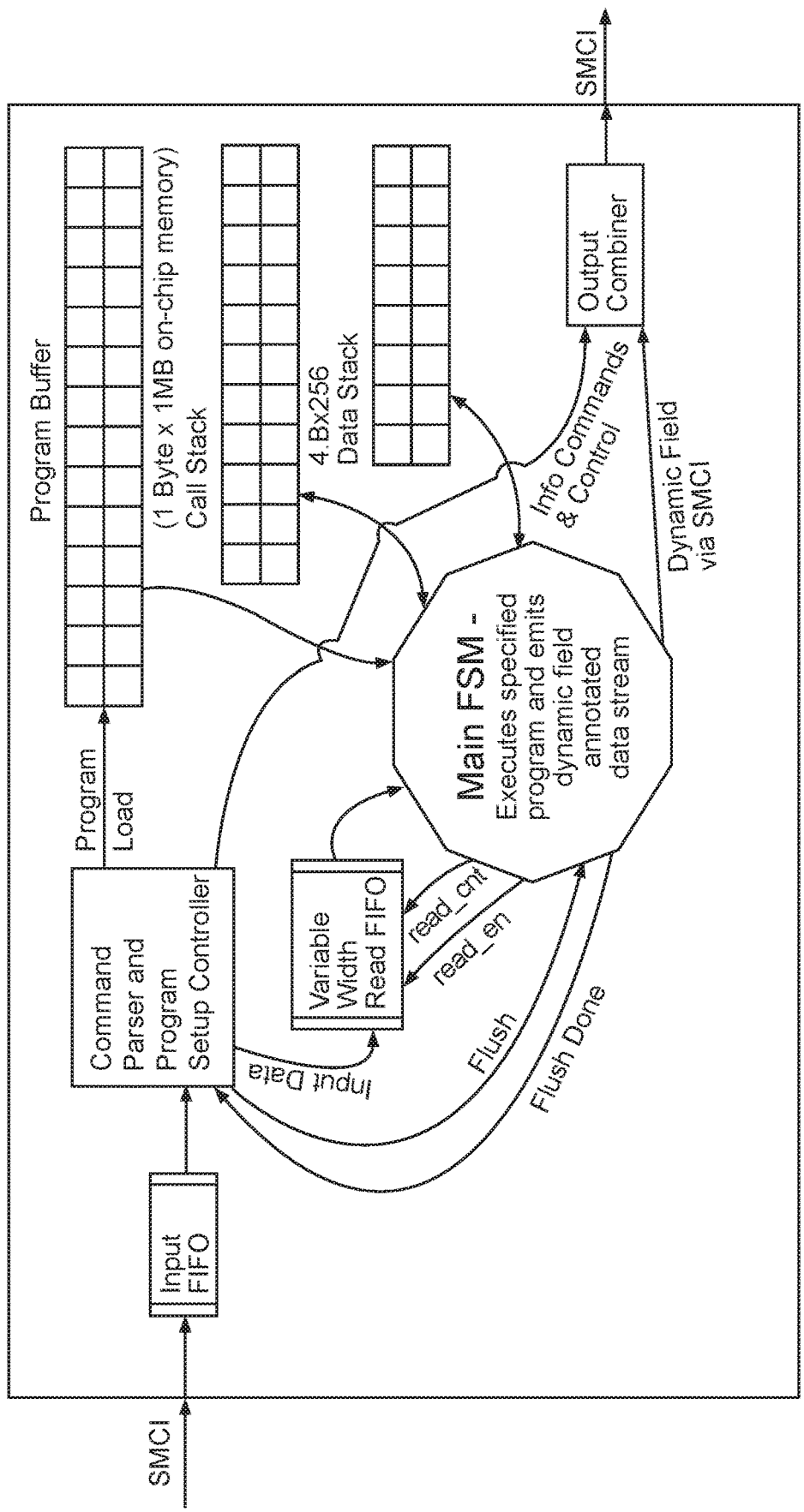
FIG. 8 depicts an example embodiment for a hardware DynField interpreter.

Hardware Dynamic Field Interpreter 110:

FIG. 8 discloses an example embodiment for a hardware dynamic field interpreter 110. In an example embodiment, the hardware dynamic field interpreter relies on the software compiler to create the program. Then a Direct Memory Access (DMA) engine delivers data to the interpreter module using a subset of the SMCI signals (as discussed above and explained in more detail in the above-referenced and incorporated '580 patent application). This program is delivered delimited between commands, and the Command Parser has an additional module to load the hardware program buffer as shown in FIG. 8. There is a master state machine (Main FSM) that controls the overall behavior of the interpreter. It reads data from the program buffer to know what subroutines and instructions to execute, loads data onto the call and data stacks when new subroutines are executed and reads data in variable byte chunks per cycle from the input stream.

The Command Parser does the typical module setup as previously described. In addition, this module also reads the program from the input stream and loads the contents of the program buffer components. The program buffer is made up of a register that holds the total number of subroutines in the program, a small memory array that holds a number of fixed-sized elements that indexes the offsets of the subroutines in memory and finally an on-chip RAM to hold the actual subroutine contents. Each subroutine entry can be laid out in the following manner: {16-bit field to hold the number of instructions, one entry per instruction containing its offset into the buffer, and finally the instruction contents themselves}. The subroutine buffer size can be 1 MB large. This is set to zero on global reset.

The Call stack is embodied in an on-chip RAM that can be organized as 4-bytes×256 elements. Each 4-byte entry contains a triplet: {Subroutine index, Instruction index, Step index}. This is set to zero on global reset.

The Data stack is embodied in an on-chip RAM that can be organized in 20-bytes×256 elements, each of which represents a state slot. A state slot entry can be up to 20 bytes in length and multiple state slots can be used to represent a larger data value. This is set to zero on global reset.

Figure 9:
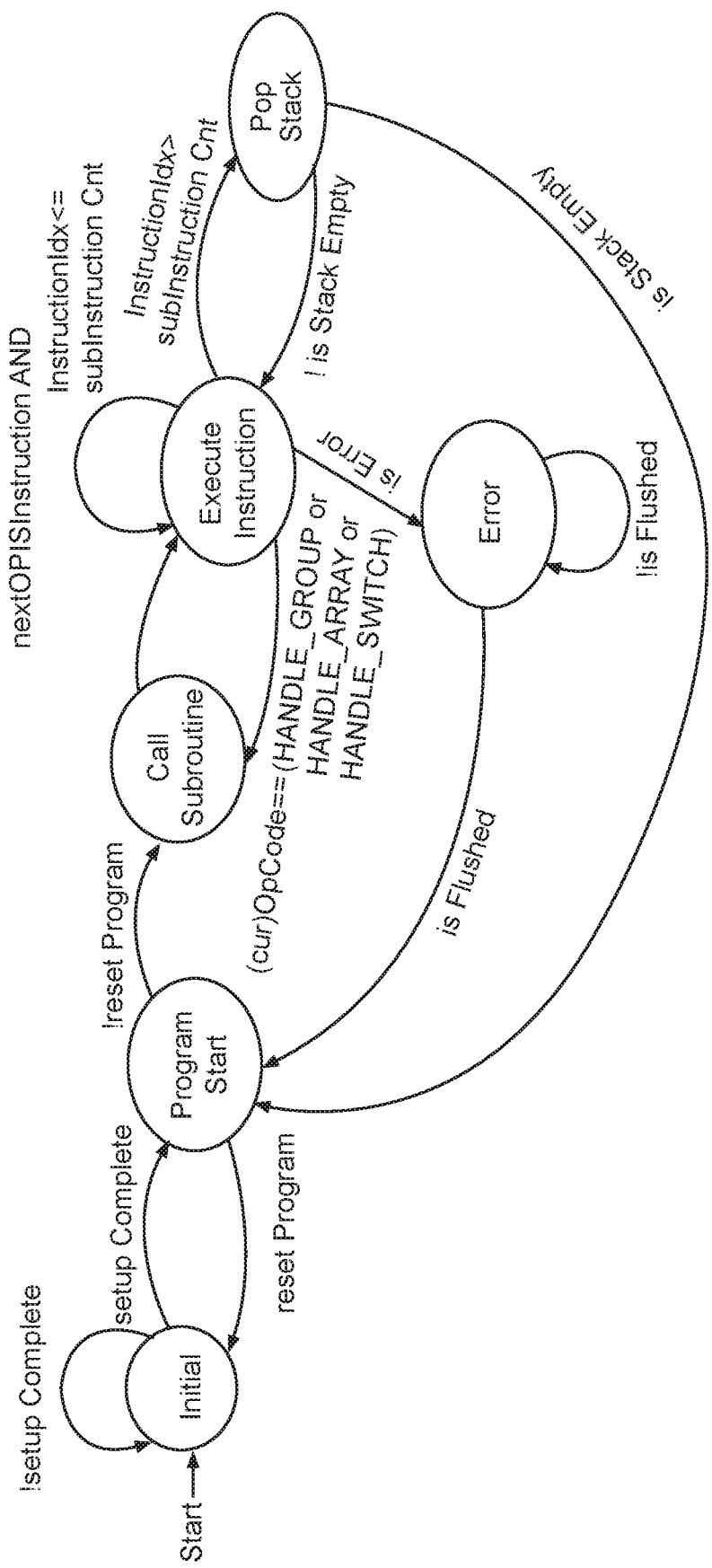
FIG. 9 depicts an example embodiment of a state diagram of a Main FSM for the hardware interpreter embodiment of FIG. 8.

The Main FSM is responsible for controlling the state of the data parse. FIG. 9 shows the states contained in the FSM. The FSM is initialized to the Initial state on power on or global reset. Once the Command Parser has finished loading the Program Buffer, it will signal the Main FSM that the setup has finished by setting the setupComplete wire to high. Then the Main FSM is ready to execute the program once it has transitioned to the Program Start state. As long as the reset Program hasn't been requested by the Command Parser, the FSM will transition to the Call Subroutine state on the next clock cycle. This state has logic that sets the execution pointers to location zero on the stack, preparing for execution of {subroutine 0, instruction 0, step 0}. On the next clock cycle, this will transition to the Execute Instruction state. This state reads the opcode and implements the minimal steps to execute this.

Depending on the instructions that are executed, we may need to call into another subroutine. The instructions that can cause us to invoke a new subroutine are: "handle group", "handle array", and "handle switch". In that case we transition back to the Call Subroutine state and push the appropriate data onto the stacks and set the subroutine index to the current value. Then, we transition back to the Execute Instruction state. If we execute all of the instructions for the current subroutine, we transition to the Pop Stack state in which we update the Call Stack and Data Stack pointers back to the pre-call value and check if the stack is empty. If the stack is empty at that point we have finished our parse of the record and start from the beginning by transitioning to the Program Start state. Instructions can cause errors to be detected during execution. In this case we transition from the Execute Instruction state and into the Error state. The Error state discards all data until the next flush is detected on the input. The flush is signaled from the Command Parser. The Command Parser can also signal that a new program is to be loaded. In this case the Main FSM will transition to the Initial state.

Dynamic Field Compiler 112:

The dynamic field format supports the interpretation of one field being dependent upon the value in another field. For example, the length of an array is often specified by a length field somewhere nearby in the data structure. Similarly, the interpretation of a switch (union in C, redefine in COBOL) is often specified by a type field somewhere nearby in the data structure. The lengths and switch choices are defined using expressions. An expression supports the operators for getting the value of a field, getting a constant value, performing basic arithmetic on numbers (add, subtract, multiply, divide, remainder), checking for equality, and performing basic Boolean operations (and, or, not). When getting the value of a field, the target field is identified with afield reference, which identifies where the target field is located in the type graph relative to the field on which the expression is defined. A field reference looks like a relative file name in a conventional file system. Switch choices are described using a "when" expression specified for each case. The first case listed in the switch who's "when" expression evaluates to true is the chosen case.

Figure 10:
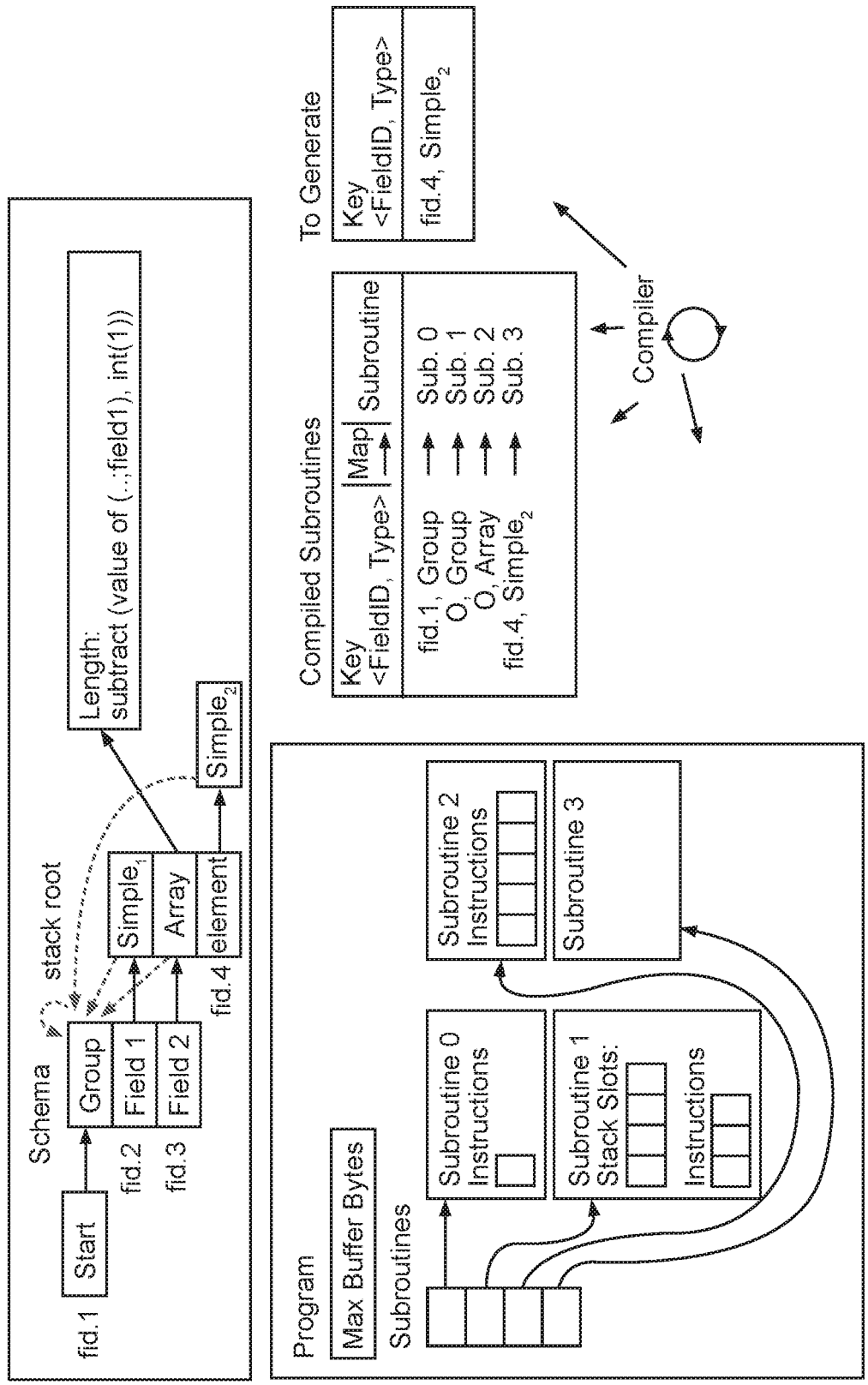
FIG. 10 depicts an example run-time environment for a compiler in accordance with an example embodiment.

Within the compiler, subroutines are identified with a key that is the tuple <field id, type>. During the compilation phase, subroutines have a list of instructions, an assigned index, and a list of items stored on their data stack. The compiler maintains a map of all compiled subroutines by subroutine key. The compilation process is driven by a set of subroutine keys that still need their instructions generated. An example of the compiler's run time environment is shown in FIG. 10.

Compilation starts by preprocessing all the types that are reachable from the start member of a specified DynField schema 114. The preprocessing verifies basic syntax constraints (e.g., fields cannot be zero length; delimited fields have delimiters specified, expressions don't try to compare a Boolean with a number, etc.). It identifies which types will define data stack frames. These "stack root types" are the initial type and the first reachable type of a loop in the type graph. It also marks fields that are used in expressions so that they can be saved on the data stack when encountered during parsing. It also inspects all the "when" expressions for switches to identify the constant keys and generate the hash table.

Code generation starts by creating an empty subroutine with index 0 for the start member (the key being the start member's field id and type) and adding it to the to-begenerated set. Then the compiler iteratively pulls one subroutine from the to-be-generated set and builds it, until the to-be-generated set is empty. The generated subroutines are assigned sequentially increasing indices and stored in the program's array of subroutines. The instructions generated depend upon the type the subroutine corresponds to.

For a fixed width simple type, the "copy to stack" instruction is added if the field has been marked as needing to be saved to the stack. Finally a "copy to output" instruction is added.

For a delimited simple type, the "copy until delimiter" instruction is added.

For a counted simple type, the instructions to evaluate the length expression are added, a "range check" instruction is added, and a "copy counted" instruction is added.

For a group type, array type, or switch type with a non-zero field id, a "handle group" instruction is added that calls a new subroutine with key (0, type).

For a group type with a zero field id, instructions for each of the fields are added to the subroutine, based on the field's type.

For a fixed width array type with a zero field id, a "copy to stack" instruction that writes the constant array size is added. Then a "handle array" instruction is added referencing the array size on the stack and a new subroutine for the element type.

For a variable width array type with a zero field id, the instructions to evaluate the length expression are added, a "range check" instruction is added, and a "handle array" instruction is added referencing the array size on the stack and a new subroutine for the element type.

For a switch type with a zero field id, the instructions generated depend on whether the field referenced is a forward reference (not yet read from the input stream) or a backward reference (already read from the input stream). For a forward reference, a "copy to stack" instruction is added. For a backward reference, the referenced field is already on the stack. Next, a "handle switch" instruction is added, referencing the key on the stack, the pre-built hash table, all the new subroutine for the case types, and possibly a new error subroutine if the switch has no default case.

For a length expression, constants are written to the stack using "copy to stack" instructions. Backward field references are already on the stack. Forward field references are written to the stack using "copy to stack" instructions. Non-native-format numbers on the stack are converted to native-format numbers by adding a "convert number" instruction. Binary arithmetic results are written to the stack using "basic math" instructions until the final numeric result of the expression is written to the stack.

Once there are no more subroutines to generate, Compilation completes with a post-processing step that examines all the subroutines and determines the maximum amount of buffering needed, saving this value in the program. This completes compilation.

FIG. 11A depicts an example XML DynField schema definition for the compiler, and FIG. 11B depicts an example of a program 500 produced by the compiler from the schema of FIG. 11A.

Data Bundling:

In one example embodiment, the translation engine 102 can place one token type (field, group-start, group-end—a DF token) in each token 400 (message). This is easy and flexible, but has the overhead of generating a lot of small messages. In another example embodiment, multiple token types can be put into single tokens 400 via bundling.

Bundling is the idea of putting multiple DF tokens in a single message. Every dynamic field (DF) field and group has an id. We can look at the schema 114 and see which ids always occur in a run in the output stream. We can "bundle" all those ids up into a single message. Thus, a DF bundle is a single message containing the content of multiple DF tokens concatenated together. The bundle is defined by the list of the ids it contains. Note that a bundle message will only contain field data, but the bundle definition will contain group start/end markers as well as fields. Each bundle also has an id (in that same namespace). A message containing a single DF token can thus be looked at as a degenerate bundle. Importantly, a fixed field layout is also a bundle. This means we can represent multiple fixed-field layouts as multiple bundles within a single schema.

Bundles can be generated automatically from a schema 114. The compiler 112 may be used to perform the bundling. There are multiple ways a schema 114 can be grouped into bundles. For example, we currently generate bundles using only the rules described below, but in the future we could allow the user to give hints of how to split bundles for more efficient processing, or even gather those hints from the workflow configuration itself.

We define bundles by recursively descending to the leaves of the schema 114 and merging child bundles as we work our way back up to the root of the schema. Bundle definitions are actually created as composites because there is special handling for the different types. Bundles are always runs of ids, but bundle composites have the additional information needed to parse input and generate the right sequence of bundle messages. A bundle composite is a list containing three kinds of members: bundles, variable-elements, and switch-elements.

A bundle composite for a simple type is just a bundle containing the field token.

A bundle composite for a group is a bundle containing the concatenation of the group-start token, the bundle composites for all the group's fields, and the group-end token.

A bundle composite for a variable length type consists of a bundle for the group-start token, a variable-element (referring to the separate messages for the repeated content type), and a bundle for the group-end token.

A bundle composite for a switch is a switch-element containing a reference to the controlling switch and one bundle composite for each switch case. At run time, the appropriate bundle composite is chosen based upon the matching switch case.

Rules regarding concatenation/composition of bundle composites can be as follows:

Two adjacent bundles can be concatenated.

A bundle can be concatenated onto every branch of a switch (like the distribution of multiplication over addition).

Switches have a tendency toward combinatorial explosion. Also, for an example embodiment, we currently only do one table look up to resolve a switch. For these reasons, we are using the following rules to limit combination. When a switch cannot be combined, it is put into a separate message just like a variable length type.

A switch cannot contain another switch.

A switch that follows another switch is not combined, but rather kept in a separate bundle.

future: A switch with more than n cases cannot be combined with other bundles.

Types can be forced to separate messages to break cycles in the type graph.

The tree of bundle composites is effectively a mirror of the tree of types, with large sections of the type tree globbed together into single nodes in the bundle composite tree. Because of this globbing, the bundle composite tree is usually much smaller.

Stream Processing Engine 106:

In an example embodiment, the stream processing engine 106 can be configured perform stream processing on the reformatted byte stream 104. As an example, the stream processing engine 106 can select fields of the reformatted byte stream for targeted processing without further analyzing the data characters of the reformatted byte stream 104, thereby greatly improving the throughput performance of the system. The stream processing engine 106 then performs data processing operations on the selected fields to generate a processed byte stream 108. This processed byte stream 108 can also exhibit the dynamic field format of the reformatted byte stream 104. The stream processing engine 106 can be implemented in software via a GPP, in firmware via reconfigurable logic, or any other platform desired by a practitioner (e.g., a GPU, multi-core processor, cell processor, etc.).

For example, the stream processing engine 106 can be configured to perform various processing operations as part of data quality checking in connection with extract, transfer, and load (ETL) operations for a database. Some exemplary processing operations can include:

Address Validation: A field expected to contain an address can have the address data validated as to whether it exhibits a correct postal service-recognized address format.

Email Validation: A field expected to contain an email address can be validated as to whether it exhibits a correct email address format.

Date Validation: A field expected to contain a date can be validated as to whether it exhibits a date in the correct range and format.

Query/Replace: The data characters in a select field can be translated from one set to another set (e.g., mapping codes from one code set to another code set or replacing codes with natural language descriptions of such codes).

Field Masking/Tokenization: The data characters in a selected field can be obfuscated or tokenized for security purposes.

Filtering/Searching: The data characters in selected fields can be matched against various search criteria.

It should be understood that these are but a few of exemplary data processing operations that can be performed by the stream processing engine 106.

Furthermore, it should be understood that these data processing operations can be legacy data processing operations that are implemented in software on processors of a practitioner. Also, if desired, a practitioner can deploy such data processing operations via reconfigurable logic to achieve still further acceleration. Examples of hardware-accelerated data processing operations that can be performed by the data processing stage 300 include data processing operations such as regular expression pattern matching, approximate pattern matching, encryption/decryption, compression/decompression, rule processing, data indexing, and others, such as those disclosed by U.S. Pat. Nos. 7,636,703, 7,702,629, 8,095,508 and U.S. Pat. App. Pubs. 2007/0237327, 2008/0114725, 2009/0060197, and 2009/0287628, the entire disclosures of each of which being incorporated herein by reference.

Hardware Accelerated Stream Processing:

In embodiments where a stream processing engine 106 is implemented in hardware (such as on an FPGA), the stream processing engine 106 can take the form of a hardware-accelerated data processing stage. Such a hardware-accelerated data processing stage can tap into the output of the translation engine 102 (e.g., an output from the combiner of the hardware interpreter shown by FIG. 8).

Examples of hardware-accelerated data processing that can be performed by a hardware-accelerated data processing stage include data processing operations such as regular expression pattern matching, approximate pattern matching, encryption/decryption, compression/decompression, rule processing, data indexing, and others, such as those disclosed by the above-referenced and incorporated U.S. Pat. Nos. 7,636,703, 7,702,629, 8,095,508 and U.S. Pat. App. Pubs. 2007/0237327, 2008/0114725, 2009/0060197, and 2009/0287628. This hardware-accelerated data processing can be field-specific by leveraging the information present in the metadata or SMCI signal to identify record and field boundaries.

Figure 12:
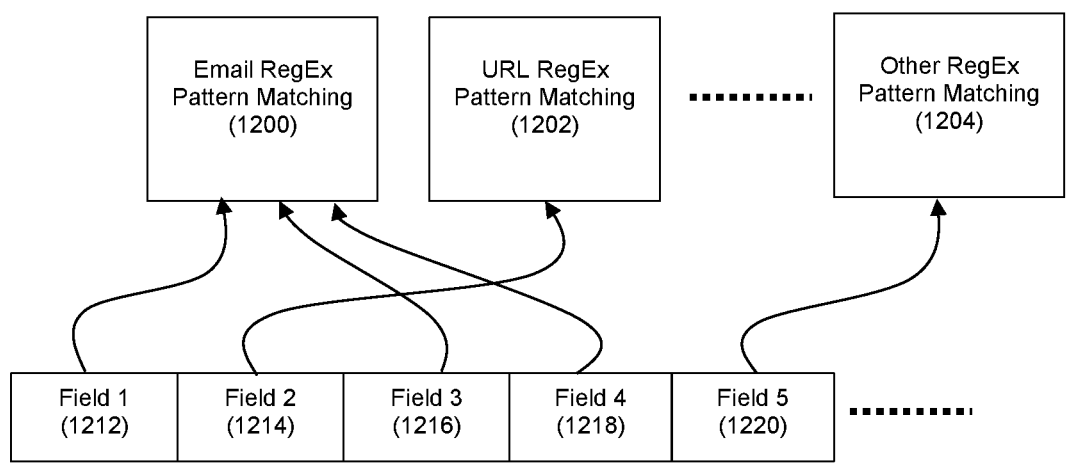
FIG. 12 depicts an example of field-specific hardware-accelerated data processing with respect to regular expression pattern matching.

An example of field-specific hardware-accelerated data processing is shown by FIG. 12 with respect to regular expression pattern matching. A practitioner may have a desire to perform regular expression pattern matching with respect to different patterns for different fields of the data. Examples of different pattern types for there may be a desire to perform regular expression pattern matching include email patterns (e.g., via email RegEx pattern matching 1200), uniform resource locator (URL) patterns (e.g., via URL RegEx pattern matching 1202), social security number (SSN) patterns, credit card number patterns, and others (e.g., via other RegEx pattern matching 1204).

As shown in FIG. 12, different fields of the data can be mapped to different regular expression pattern matching operations. For example, Fields 1, 3, and 4 of the data can be mapped to regular expression pattern matching that is configured to detect email patterns (see fields 1212, 1216, and 1218 in FIG. 12). Field 2 of the data can be mapped to regular expression pattern matching that is configured to detect URL patterns (see field 1214 in FIG. 12). Field 5 of the data can be mapped to regular expression pattern matching that is configured to detect some other pattern type (e.g., an SSN pattern) (see field 1220 in FIG. 12).

In an exemplary embodiment, several different regular expression pattern matching modules can be instantiated in the hardware platform (e.g., reconfigurable logic such as an FPGA) for operation at the same time, whereby one of the regular expression pattern matching modules is configured to detect email patterns, another of the regular expression pattern matching modules is configured to detect URL patterns, and another of the regular expression pattern matching modules is configured to detect the other pattern.

However, in another exemplary embodiment, a single regular expression pattern matching module can be instantiated in the hardware platform, such as the regular expression pattern matching module described by the above-referenced and incorporated U.S. Pat. No. 7,702,629. The transition table memory that stores data to key the regular expression pattern matching module to search for a particular pattern can then be loaded with transition data for an email pattern, URL pattern, or another pattern on an as needed basis at run-time as different fields stream through.

Data Pivot to Accelerate Downstream Field-Specific Data Processing:

The embodiments described herein discuss stream processing operations that may be performed on translated (e.g., the stream processing may perform computing tasks such as address validation, email validation, date validation, query/replace, field masking/tokenization, encryption, decryption, and/or filtering/searching). As noted, some of these processing tasks may be targeted to specific fields in the streaming data, and the ability to pivot the streaming data to effectively group common fields between records may provide significant improvements with respect to how quickly and efficiently the field-specific data processing operations are performed.

For example, some of field-specific processing tasks may be performed by a GPU. GPUs provide thousands of cores to process data-parallel applications. The GPU operates most efficiently when all of the cores are operating on the same instructions. Instructing the GPU to operate on the same instructions can be a challenge for many computing tasks that could be accelerated with the GPU because real-world tasks typically involve many branching paths through the source code. A kernel with many branches is one example of where the benefits of using the GPU quickly diminish unless the architecture around the GPU is carefully designed.

Aggregating data with similar processing needs can help minimize branching, and thus maximize throughput, through a GPU kernel. For record-oriented data, because data operations are usually performed on a subset of specific fields, similar data may be aggregated by having software first collect one or more fields in each record and copy each field index to a host buffer to send to the GPU. This process is commonly known as a pivot operation as the "columns" gathered from the input stream are copied and stacked as "rows" on the host. As another example, software may gather social security numbers and birth dates for encryption. In this example, the software may use two pivot buffers: the first for the social security number field and the second for the date of birth field. While a GPU has been described and will be described as the exemplary processing device that performs aggregated processing, any multi-core processor may benefit from the data pivoting methods described herein. For example, a cell processor or a multi-core processor may benefit from data pivoting. In addition, this technique can be used to reduce the I/O bandwidth requirements to move data to and from a reconfigurable logic device. Also, data pivoting may be applied to more types of data than just record-oriented data.

As an example, data organized in records may need a specific field encrypted, and a GPU may efficiently perform such encryption. As an example, the GPU can be configured to perform format preserving encryption (FPE). An example of FPE is described in Vance, Joachim, "VAES3 scheme for FFX: An addendum to 'The FFX Mode of Operation for Format-Preserving Encryption'", May 20, 2011, the entire disclosure of which is incorporated herein by reference. For example, to hide the identity of medical patients for privacy purposes, a computer system may encrypt all the patient names stored in the medical records. A GPU may efficiently encrypt the names of all medical patients because similar encryption processing needs to be performed on a plurality of names stored as a name field in a plurality of records. In this example, the "column" representing the name field for all the patients must first be "pivoted" into a "row" so that the GPU may perform parallel encryption processing on the name fields and leverage the thousands of cores resident on the GPU.

After the pivoted host buffer is sent to the GPU, the GPU executes the processing specified in the kernel, which may be encrypting the names in the example above. After the GPU executes the kernel, the GPU copies the data back to the host. By aggregating data with similar processing needs, the GPU maximizes the amount of uniformity in the kernel execution.

Figure 13:
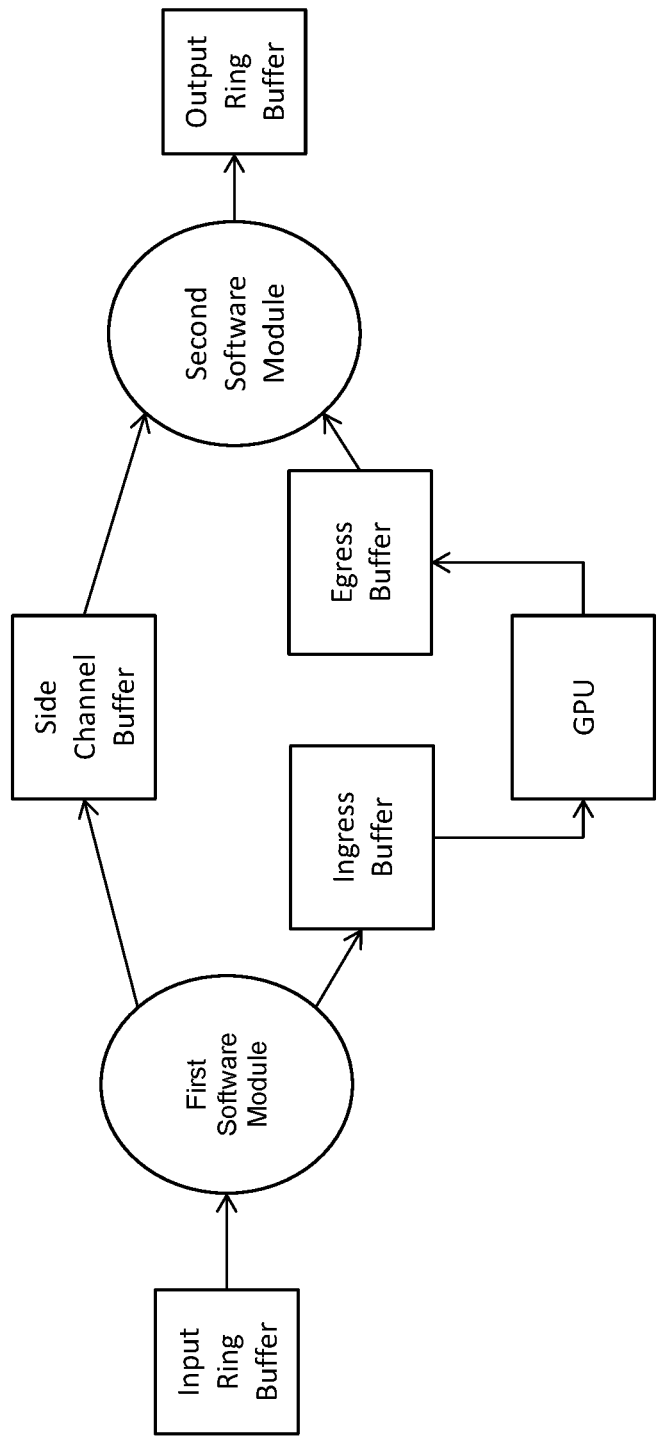
FIG. 13 depicts an example of data pivoting and de-pivoting.

FIG. 13 illustrates the modules and components comprising the data pivot and de-pivot operation. These modules and components can be executed in software by a processor. For exemplary purposes, the input data described herein shall be record-based data, but the data does not need to be record based for the pivoting operation. The data pivot operation includes an input ring buffer, an output ring buffer, a first and second software module, an ingress buffer and an egress buffer, a side channel buffer, and a GPU. A GPU is illustrated by way of example in FIG. 13, but it should be understood that the GPU may be replaced by any multi-core or cell processor or reconfigurable logic device such as an FPGA.

The input ring buffer provides a data stream, and the first software module receives the data stream from the input ring buffer. The first software module is configured to manage ingress buffer allocation, identify fields which need to be processed by the GPU, and copy the fields that need to be processed by the GPU into the ingress buffer. The first software module also copies the data stream to the side channel buffer. The data in the side channel buffer may include all the data received by the first software module from the input ring buffer. The side channel buffer may hold the data from the input data stream while the GPU processes some of the fields of the data stream until the de-pivot operation.

The ingress buffer may comprise a pool of ingress buffers, and the first software module may allocate available ingress buffers to store information until data is ready to be sent to the GPU. The ingress buffers are also configured to provide data to the GPU at the direction of the GPU. The egress buffer may also be a pool of buffers, which are allocated by the second software module. The GPU places processed data in the egress buffers after completing the processing task on a field of data.

The second software module is configured to copy all the data from the side channel buffer into the output ring data. In addition, the second software module "de-pivots" each processed field by copying processed data from an egress buffer and overwriting the original data in the corresponding field in the output ring buffer until every used egress buffer has been emptied.

It should be noted that the ingress and egress buffers may come from the same buffer pool. In this way, the first software module or the GPU allocate unused buffers from a pool of buffers for ingress and egress. In another embodiments, the ingress and egress buffers may be separate pools of buffers.

Figure 14:
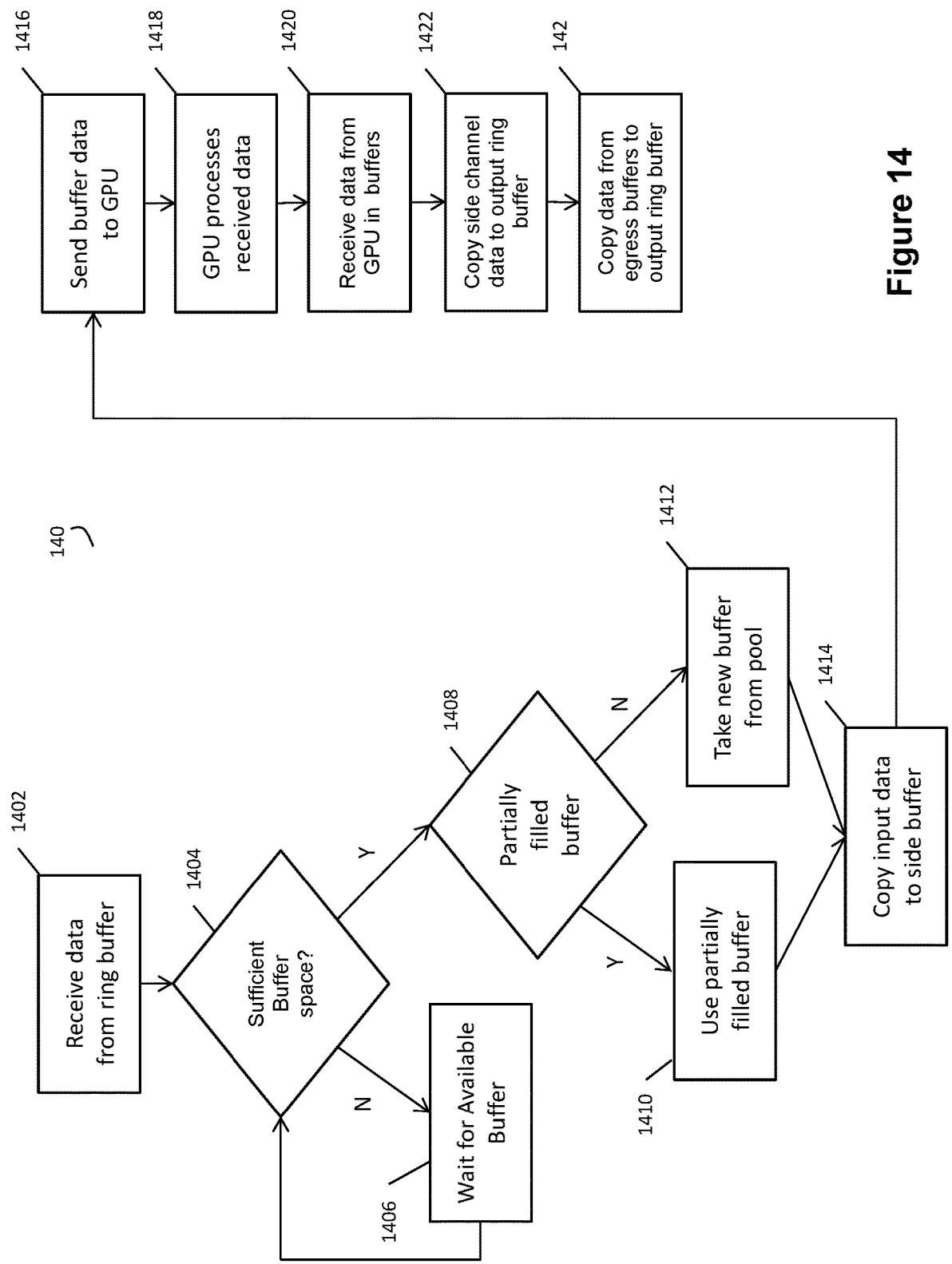
FIG. 14 depicts an example flow for data pivoting and de-pivoting.

FIG. 14 illustrates the method for data pivot and de-pivot before and after processing data using, for example, a GPU. The method 1400 begins in step 1402 when the first software module receives the input data stream from the input ring buffer. After receiving the input data stream, the first software module determines if there is sufficient buffer space to process the input data in step 1404. If the first software module determines there is not sufficient space, the first software module waits until buffer space becomes available in step 1406, such as by waiting for the GPU to begin processing the next batch in a work queue. If the first software module determines that sufficient buffer space is available, the first software module determines if there are any partially-filled ingress buffers already in use for each input field to be processed in step 1408. In other words, the first software module determines whether or not previous buffers have been filled with similar data fields to be processed by the GPU. If a partially-filled buffer exists, the first software module copies the fields to be processed by the GPU into the pre-allocated buffer pool in step 1410. If no partially filled buffers are available, the first software module takes a new ingress buffer from the buffer pool and copies the identified field data to the newly allocated ingress buffer in step 1412.

In some situations, more than one field from a record may be processed by the GPU. For example, if more than one field in a record should be encrypted, then the first software module copies all the fields that need to be processed by the GPU into ingress buffers. However, if more than one field is to be processed by the GPU, then each field of interest across the records is copied into a separate ingress buffer. For example, if fields 0 and 5 are to be processed by the GPU, the first software module copies the data for field 0 in each record to a first ingress buffer and the data for field 5 in each record into a second ingress buffer.

While the first software module searches for fields to be processed by the GPU, the first software module also copies the data from the input ring buffer into the side channel buffer in step 1414. The side buffer holds the input data while the pivoted fields are processed by the GPU until the processed data is ready to be de-pivoted.

After each ingress buffer becomes full, the buffer data is sent to a work queue for the GPU. The ingress buffer may also send data to the work queue if it receives an end of file signal from the first software module or a side channel buffer space full signal. The GPU may signal when it is ready to begin processing another batch of data, and the GPU may begin processing the data in the work queue in step 1418.

After processing the data, the second software module may handle egress of data from the GPU. The second software module may receive data from the GPU and place the field data in egress buffers in step 1420. For example, the second software module de-queues buffers from the GPU work queue only when the GPU indicates the it has completed transforming the buffer contents.

Once all of the fields in each record have been transformed by the GPU, the second software module completely copies the data in the side channel buffer into the output ring buffer in step 1422. Also, the second software module copies processed fields from the egress buffers and "de-pivots" the processed field data by copying the processed field data from the egress buffers into the outbound ring by overwriting the original data for that field in step 1424. For example, if the GPU encrypted data from field 0, the second software module copies the encrypted data from the egress buffer into field 0, thereby overwriting the original, unencrypted data in field 0 with encrypted data. This process continues until the second software module copies the data contained in all the egress buffers. After copying data from an egress buffer, the second software module releases the buffer back into the buffer pool. If the egress and ingress buffers are pulled from the same pool, the buffers become like an assembly line, wherein the first software module may commission a buffer recently used as an egress buffer for storing field data as an ingress buffer.

It should be understood that the egress side of the process flow of FIG. 14 can also include appropriate software checks to ensure that there is sufficient available buffer space.

There are instances where the efficiency of the GPU can be increased even further by adding pre and post processing tasks on the fields during pivot and de-pivot. Pre-processing can be done by the first software module as an additional step as it copies the data from the input ring buffer to the ingress host buffer. Post-processing can be performed by the second software module as an additional step when copying data from the egress buffers onto the output ring buffer. Examples of pre-processing and post-processing operations might include field re-sizing (via padding and de-padding), data conversions, etc. Additional processing threads and ring buffers can be added to the architecture if the pre and post-processing steps create a processing bottleneck in the system.

Also, it should be understood that such data pivoting and de-pivoting in connection with aiding field-specific data processing can be employed by a computing system independently of whether the computing system also performs the data translations described herein.

Representing Plain DF, XML, and JSON in a Homogenous Manner:

As indicated above, dynamic field (DF) tokens can represent data for not only schema-driven dynamic fields but also XML and JSON. The DF token metadata can be broken down into (1) core flags, (2) token type, (3) field identifier, (4) region of interest identifier, and (5) user tags. The token type, field identifier, and region of interest identifier are somewhat interchangeable in that they help identify the purpose or type of content for a particular field.

When there is a schema available (plain DF), the field identifier identifies a member in the schema, and type information can be drawn from the schema. Relatively few token types are needed in this case in order to represent the stream.

When there is no schema available (raw XML and raw JSON), the token types capture what little information is available in XML and JSON about the purpose of a token. More token types are thus needed when no schema is available. The available information is primarily structural, which is why that information is stored in the token type. A second pass through the raw data is usually needed to identify interesting fields in such cases. A regular expression engine can be used to identify the interesting fields and "tag" them with a region of interest identifier.

The core flags can be VMETA_START_DATA, VMETA_END_DATA, VMETA_START_RECORD, VMETA_END_RECORD, and VMETA_REJECT. The VMETA_START_DATA and VMETA_END_DATA flags are used to allow a field to span multiple tokens. If not spanning tokens, both bits should be set (including on tokens with empty content). The VMETA_START_RECORD and VMETA_END_RECORD flags are used to identify the bounds of top level records. The VMETA_REJECT flag identifies a token as rejected. A rejected record can have the reject bit set on all of its fields. A tag router can help with ensuring this.

The remaining sections of metadata can be allocated as necessary according to a workflow. The exact bits used may depend on the workflow as a whole and may vary from workflow to workflow.

For plain DF, only 2 bits are needed from the type field (VMETA_DF_TYPE_MASK).

For XML and JSON, 4 bits are needed from the type field (VMETA_VXML_TYPE_MASK, VMETA_VJSON_TY- PE_MASK). ConfigData::GetMetadataConfig( ).EnableVxmlTypes( ) and .EnableVjsonTypes( ) are used in xmlcore to indicate that a module will need to handle XML or JSON and needs the extra bits. To save bits, the JSON types can be squeezed in alongside the XML types. VMETA_VXML_TYPE_MASK and VMETA_VJSON_TYPE_MASK can be identical; EnableVxmlTypes and EnableVjsonTypes do the same thing. They can be kept separate in the code in case they turn out to be different later.

The field identifier, region of interest identifier, and user tag bits are allocated as needed, and may require no bits. Field identifiers can be assigned globally across all schemas in the workflow so that fields not modified by a schema change will not have to have their field identifiers changed in the middle of the chain.

Token types can be chosen to be distinctive enough such that an output engine can produce vaguely sensible output even if plain DF, XML, and JSON data are mixed together. This may affect an XML renderer, which can render plain DF, XML, and JSON as XML. FIG. 15 identifies the token types that can be used for plain DF, XML, and JSON respectively. These token types can be mixed within a single data stream. FIG. 15 also identifies the compatibility of these token types across plain DF, XML, and JSON based on shared rows in the table of FIG. 15.

Parsing XML and JSON Data:

XML parsing can be done in three stages. The first stage performs character set conversion (from the input character set to UTF-8) if necessary and carriage return normalization according to the XML specification. The second and third stages can be identical XML parsers but configured slightly differently. The XML parser is similar to a state-machine driven parser for a delimited input format, but with significantly more states due to the size of the XML language. While a CSV parsing state machine has about five states, an example XML parser has 43 states because it must recognize 10 different token types (semantically distinct units in the XML language) which have multi-character delimiters (including a 9 character delimiter). The XML parser examines each character, and based on a decision table for the current state, changes to the next state and either adds the character as part of the current token or finishes the current token and starts a new one. Separate second and third stages are needed to handle XML entities, which allow arbitrary text to be substituted for a delimited name. This arbitrary text can contain new XML. So the second stage parses and tokenizes the input stream, preserving character references and substituting in entity references. The third stage parses and tokenizes any newly introduced XML and substitutes in character references. Because of the rules in the XML specification about what kind of nested XML is permissible within an entity, only one additional pass is required. After these three stages, raw XML input data has been converted into semantically equivalent DF tokens.

JSON processing is another delimited input format. JSON is richer than CSV but nowhere near as complicated as XML. The JSON parser is again a state machine driven delimited input parser, with about 27 states in an example embodiment. An example JSON parser produces seven token types and only needs a single pass.

While the present invention has been described above in relation to its exemplary embodiments, various modifications may be made thereto that still fall within the invention's scope. Such modifications to the invention will be recognizable upon review of the teachings herein.

What is claimed is:

1. A method for stream processing of data, the method comprising:
   translating, by a processor, a first data stream into a second data stream, the second data stream exhibiting a dynamic field format according to a dynamic field schema, wherein the dynamic field format (1) comprises an ordered collection of fields that supports variable length fields and nested hierarchical data structures, (2) is flexible at execution time, and (3) is self-describing with regard to field boundaries and the nested hierarchical data structures, wherein the second data stream comprises a plurality of tokens, each of a plurality of the tokens comprising token data and token metadata, the token data comprising a plurality of data characters of the first data stream that serve as payload data for the second data stream, the token metadata describing how the data characters relate to the dynamic field format; and
   performing, by a processor, a processing operation on token data within the second data stream over a sequentially advancing window of the second data stream based on an analysis of the token metadata, wherein the second data stream has a length that is longer than a length of the window.

2. The method of claim 1 wherein ordered collection of fields that supports variable length fields and nested hierarchical data the first data stream comprises complex, hierarchical data that includes a typed sequence of data, and wherein the token metadata comprises metadata indicative of where boundaries are located for a container of the typed sequence.

3. The method of claim 2 wherein the dynamic field format supports a plurality of types, the types comprising a simple type, a group type, an array type, and a switch type, and wherein the typed sequence corresponds to the group type, the array type, or the switch type.

4. The method of claim 3 wherein the dynamic field schema specifies a plurality of the supported types.

5. The method of claim 4 wherein the dynamic field schema further specifies a start member.

6. The method of claim 1 wherein the performing step comprises:
   a processor selectively targeting a field of the second data stream for a data processing operation based on the analysis of the token metadata and without analyzing the data characters of the second data stream.

7. The method of claim 6 wherein the selectively targeting step comprises the processor selectively targeting a field of the second data stream based on a plurality of field identifiers in the token metadata.

8. The method of claim 6 wherein the first data stream comprises a plurality of records, the records comprising a plurality of the data characters in a plurality of fields.

9. The method of claim 6 wherein the data processing operation comprises at least one of (1) field re-formatting, (2) data format conversion, (3) lookup and replace, (4) field masking, (5) regular expression pattern matching, (6) exact matching, (7) approximate matching, (8) address masking, (9) filtering and selection, (10) encryption, (11) decryption, (12) aggregation, (13) address validation, (14) email validation, and (15) data validation.

10. The method of claim 6 wherein the performing step further comprises:
    a processor pivoting data corresponding to a plurality of records within the second data stream to group the selectively targeted field in the plurality of records; and a processor performing the data processing operation on the grouped fields in parallel.

11. The method of claim 10 wherein the processor that performs the data processing operation on the grouped fields in parallel comprises a graphics processing unit (GPU).

12. The method of claim 1 wherein the token metadata comprises:
    a token type;
    a start of data flag;
    an end of data flag;
    a start of record flag;
    an end of record flag; and
    a field identifier.

13. The method of claim 12 wherein the token metadata further comprises a length for the data.

14. The method of claim 13 wherein the token metadata further comprises an application-specific metadata value.

15. The method of claim 12 wherein the token type is a member of a group of available token types, the available token types comprising:
    a field type;
    a start of group type; and
    an end of group type.

16. The method of claim 12 wherein the tokens are variable length tokens.

17. The method of claim 1 wherein the translating step further comprises a processor bundling a plurality of the tokens in a single message of the second data stream such that the second data stream comprises a plurality of messages that include bundled tokens.

18. The method of claim 1 further comprising:
    a processor compiling the dynamic field schema into a program for use by the translating step, the program configured to define a plurality of rules for generating the second data stream from the first data stream in accordance with the dynamic field schema; and
    wherein the translating step comprises a processor executing the program to translate the first data stream into the second data stream.

19. The method of claim 18 wherein the program comprises an array of subroutines, each subroutine comprising an array of instructions, each instruction comprising an opcode and one or more opcode parameters, wherein the instructions are members of a group of available instructions, the group of available instructions comprising:
    an advance input instruction;
    a copy to stack instruction;
    a copy to output token instruction;
    a copy until delimiter instruction;
    a copy counted instruction;
    a handle group instruction;
    a handle array instruction;
    a handle switch instruction;
    a convert number instruction;
    a range check instruction;
    a basic math instruction; and
    an error instruction.

20. The method of claim 19 wherein the compiling step comprises a processor (1) reading the dynamic field schema and (2) based on the read dynamic field schema, (i) arranging the subroutines for inclusion in the program, and (ii) selecting instructions from the group of available instructions for inclusion in each subroutine such that the subroutines and instructions are arranged and selected in accordance with the dynamic field schema.

21. The method of claim 1 wherein the translating step comprises the processor translating the first data stream into the second data stream using a runtime environment that comprises a translation program, a call stack, a data stack, a pending input buffer, and an error flag that operate with respect to the first data stream and the second data stream.

22. The method of claim 1 wherein the translating step is performed by a hardware logic circuit, the hardware logic circuit comprising:
    an input buffer;
    a command parser;
    a program buffer;
    a call stack;
    a data stack;
    a read buffer; and
    a state machine.

23. The method of claim 22 wherein the translating step comprises:
    the command parser reading a translation program from the input buffer, the translation program comprising a plurality of subroutines, the subroutines comprising a plurality of instructions;
    the command parser populating the program buffer with the translation program;
    the command parser reading data within the first data stream and writing the read data into the read buffer;
    the state machine interacting with the program buffer, the read buffer, the call stack and the data stack to control translation of the first data stream into the second data stream according to the translation program.

24. The method of claim 23 wherein the state machine comprises:
    an initial state;
    a program start state;
    a call subroutine state;
    an execute instruction state;
    a pop stack state; and
    an error state; and
    wherein the state machine interacting step comprises the state machine transitioning through the states based on contents of the read buffer, the program buffer, the call stack, and the data stack.

25. The method of claim 1 wherein the dynamic field schema comprises an XML file.

26. The method of claim 1 further comprising:
    a processor creating the dynamic field schema via a mapping from a text file in a COBOL copybook format.

27. The method of claim 26 wherein the mapping comprises:
    mapping data names in the text file to fields in the dynamic field schema;
    mapping nested levels in the text file to groups in the dynamic field schema;
    mapping OCCURS and OCCURS DEPENDING ON in the text file to arrays in the dynamic field schema; and
    mapping REDEFINES in the text file to switches in the dynamic field schema.

28. The method of claim 27 wherein the creating step further comprises creating the dynamic field schema using an XML file linked to the text file, the XML file comprising a plurality of rules for a REDEFINE in the text file.

29. The method of claim 1 wherein the first data stream comprises XML data, the method further comprising:
    a processor performing regular expression pattern matching on the first data stream to recognize it as XML data; and wherein the translating step comprises a processor performing XML parsing on the first data stream in response to recognition of the XML data in the first data stream.

30. The method of claim 1 wherein the first data stream comprises JSON data, the method further comprising:
a processor performing regular expression pattern matching on the first data stream to recognize it as JSON data; and
wherein the translating step comprises a processor performing JSON parsing on the first data stream in response to recognition of the JSON data in the first data stream.

31. The method of claim 1 wherein the same processor performs the translating and performing steps.

32. The method of claim 1 wherein different processors perform the translating and performing steps.

33. The method of claim 1 wherein the translating step is performed by a processor executing software.

34. The method of claim 1 wherein the translating step is performed by a reconfigurable logic device.

35. The method of claim 1 wherein the translating step is performed by a graphics processing unit (GPU).

36. The method of claim 1 wherein the translating step is performed by a chip multiprocessor (CMP).

37. The method of claim 1 wherein the token metadata describes how the data characters in the first data stream are organized so that the token metadata permits fields of the second data stream to be individually distinguished without a need for state tracking to identify and edit any of the fields.

38. The method of claim 1 wherein the dynamic field format for the second data stream as expressed by the token metadata permits the processing operation to uniformly process token data within the second data stream regardless of whether the token data was generated for a first data stream in a binary format or a self-describing delimited format.

39. A method for stream processing of data, the method comprising:
a processor translating a first data stream into a second data stream, wherein the second data stream comprises a plurality of tokens corresponding to a plurality of fields of data and exhibits a dynamic field format according to a dynamic field schema, wherein each of a plurality of the tokens comprises a data portion and a corresponding metadata portion, the data portion comprising a plurality of data characters that serve as payload data for the second data stream, the metadata portion describing how the data characters in the corresponding data portion relate to the dynamic field format so that fields in the second data stream can be individually distinguished without state tracking or back tracking to identify and edit those fields; and
a processor (1) processing the metadata portions of the second data stream to selectively target fields of the second data stream for a data processing operation without analyzing the data characters of the second data stream and (2) performing the data processing operation on the selectively targeted fields of the second data stream without state tracking or back tracking to modify the data characters within the selectively targeted fields.

40. A method for stream processing of data, the method comprising:
a processor preparing a plurality of records that represent hierarchical data arranged in a plurality of fields for stream processing by translating the records into a self-describing stream of tokens according to a schema, wherein the stream of tokens collectively describe an ordered collection of fields having a nested hierarchical structure, each of a plurality of the tokens comprising a data portion and a metadata portion, the data portions comprising a plurality of data characters that represent a content portion of the records, the metadata portions comprising data that describes (i) field boundaries for the data characters and (ii) a hierarchical structure of the fields;
a processor performing stream processing on the stream of tokens by (1) selectively targeting fields of the second data stream based on an analysis of the metadata portions of a plurality of the tokens and (2) processing the data characters within the selectively targeted fields over a sequentially advancing window of the stream of tokens, wherein the stream of tokens has a length that is longer than a length of the window.

41. The method of claim 40 wherein the selectively targeting step comprises
a processor selectively targeting fields of the second data stream based on the analysis of the metadata portions of a plurality of the tokens and without analyzing the data characters of the data portions of the tokens;
wherein the data characters processing step comprises performing a processing operation on the selectively targeted fields with respect to a plurality of the records without backtracking in the stream of tokens to modify previous portions of the stream of tokens; and
wherein the method further comprises a processor modifying the records based on the performed processing operation.

42. An apparatus for stream processing of data, the apparatus comprising:
a processor configured to (1) translate a first data stream into a second data stream, the second data stream exhibiting a dynamic field format, wherein the dynamic field format (i) comprises an ordered collection of fields that supports variable length fields and nested hierarchical data structures, (ii) is flexible at execution time, and (iii) is self-describing with regard to field boundaries and the nested hierarchical data structures, the second data stream comprising a plurality of tokens, each of a plurality of the tokens comprising token data and token metadata, the token metadata describing how the token data relates to the dynamic field format so that so that fields the second data stream can be individually distinguished without state tracking or back tracking to identify and edit those fields, and (2) perform a streaming data processing operation on the second data stream by (i) selectively targeting fields of the second data stream based on an analysis of the token metadata without analyzing the token data and (ii) processing the selectively targeted fields.

43. The apparatus of claim 42 wherein the processor comprises a single processor that performs both the translation and the streaming data processing operations.

44. The apparatus of claim 42 wherein the processor comprises a first processor in cooperation with a second processor;
wherein the first processor is configured to execute software to perform the translation operation and provide the second data stream to the second processor; and
wherein the second processor comprises a reconfigurable logic device configured to perform the streaming data processing operation on the second data stream.

45. The apparatus of claim 42 wherein the processor comprises a first processor in cooperation with a second processor;
    wherein the first processor is configured to execute software to perform the translation operation and provide the second data stream to the second processor; and
    wherein the second processor comprises a graphics processing unit (GPU) configured to perform the streaming data processing operation on the second data stream.

46. The apparatus of claim 42 wherein the incoming formats for the first data stream that can be translated by the processor include a binary format and a self-describing delimited format.

47. The apparatus of claim 42 wherein the dynamic field format supports group type data within the first data stream that comprises a sequence of named fields, and wherein the token metadata for a token corresponding to the group type data within the first data stream comprises metadata that identifies where a boundary is located for a container within the second data stream of the group type data.

48. The apparatus of claim 42 wherein the dynamic field format supports array type data within the first data stream that comprises a sequence of data elements of a single data type, and wherein the token metadata for a token corresponding to the array type data in the first data stream comprises metadata that identifies where a boundary is located for a container within the second data stream of the array type data.

49. The apparatus of claim 42 wherein the dynamic field format supports array type data within the first data stream that comprises compound data of a single data type, and wherein the token metadata for a token corresponding to the array type data in the first data stream comprises metadata that identifies where a boundary is located for a container within the second data stream of the array type data.

50. The apparatus of claim 42 wherein the dynamic field format supports switch type data within the first data stream that comprises a set of variant data formats as named cases, wherein each case has an associated data type, and wherein the token metadata for a token corresponding to the switch type data within the first data stream comprises metadata that identifies where a boundary is located for a container within the second data stream of the switch type data.

51. The apparatus of claim 42 wherein the token metadata corresponding to a token comprises:
    first metadata that identifies a token type for the corresponding token from among a plurality of available token types, the available token types including (1) a first token type for a token that holds a value for a single field from the first data stream, (2) a second token type for a token that identifies a start of a container of multiple fields from the first data stream, and (3) a third token type for a token that identifies an end of the container;
    second metadata that identifies a field of the first data stream that the corresponding token represents;
    third metadata that identifies whether the identified field has data that spans multiple tokens; and
    fourth metadata that is indicative of whether the corresponding token corresponds to a record boundary.

52. The apparatus of claim 51 wherein the tokens exhibit variable lengths, and wherein the token metadata further comprises fifth metadata that identifies a length for its corresponding token.

53. The apparatus of claim 42 wherein the dynamic field format is capable of expressing data within the first data stream arranged in any of a plurality of incoming formats, and wherein the processor is further configured to uniformly perform the stream data processing operation on the second data stream regardless of the incoming format for the first data stream.

\* \* \* \* \*